US012698974B2

(12) United States Patent
M et al.

(10) Patent No.: US 12,698,974 B2
(45) Date of Patent: Aug. 4, 2026

(54) APPARATUSES, COMPUTER-IMPLEMENTED METHODS, AND COMPUTER PROGRAM PRODUCTS FOR ENERGY-BASED TRAVEL PATHWAY PLANNING

(71) Applicant: Honeywell International Inc., Charlotte, NC (US)

(72) Inventors: Ari Narayanan M, Madurai (IN); Deena Dayalan Kothandaraman, Bangalore (IN); Gobinathan Baladhandapani, Mandurai (IN); Murali Krishnan T M, Madurai (IN); Dhanabal Ammapalayam Duraiswamy, Mandurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/636,574

(22) Filed: Apr. 16, 2024

(65) Prior Publication Data
US 2025/0271274 A1     Aug. 28, 2025

(30) Foreign Application Priority Data
Feb. 28, 2024     (IN) .............................. 202411014535

(51) Int. Cl.
*G01C 21/34*          (2006.01)
*G01C 21/36*          (2006.01)

(52) U.S. Cl.
CPC ..... *G01C 21/3469* (2013.01); *G01C 21/3682* (2013.01); *G01C 21/3694* (2013.01); *G01C 21/3697* (2013.01)

(58) Field of Classification Search
None
See application file for complete search history.

(56) References Cited

U.S. PATENT DOCUMENTS 9,325,192 B2     4/2016  Fukui et al.
9,545,854 B2 *   1/2017  Daum ..................... B60L 55/00
(Continued)

FOREIGN PATENT DOCUMENTS

CN     103814394 A  *  5/2014  ............. B60L 53/63
CN     110414750 A    11/2019
(Continued)

OTHER PUBLICATIONS

Federal Aviation Administration, "Urban Air Mobility (UAM) Concept of Operations", Apr. 26, 2023, Version 2.0, retrieved from the Internet at https://www.faa.gov/sites/faa.gov/files/Urban%20Air%20Mobility%20%28UAM%29%20Concept%20of%20Operations%202.0_0.pdf on Sep. 12, 2024, 42 pages.
(Continued)

*Primary Examiner* — Kevin R Steckbauer
(74) *Attorney, Agent, or Firm* — Alston & Bird LLP

(57)          ABSTRACT

Embodiments of the disclosure provide for improved travel pathway generation. In the context of a method, the method includes obtaining travel pathway data defining a sequence of legs, each leg associated with a vehicle station. The method includes generating a required battery level for a vehicle traversing each leg in the sequence based on a current battery status, the travel pathway data, a vehicle station dataset, and a payload dataset. The method includes generating an estimated battery level upon arrival at each vehicle station based on the current battery status, travel pathway data, vehicle station dataset, and payload dataset. The method includes generating, based on the estimated and required battery levels and vehicle station dataset, an indication for each vehicle station representing whether to perform at that vehicle station an adjustment operation. The method further includes rendering a graphical user interface (GUI) comprising the respective indications.

17 Claims, 10 Drawing Sheets

(56) References Cited

U.S. PATENT DOCUMENTS

| | | | | |
|---|---|---|---|---|
| 9,612,327 | B2 * | 4/2017 | Zhang | B60L 53/80 |
| 10,259,444 | B2 * | 4/2019 | Deshpande | B60L 58/12 |
| 10,290,218 | B2 | 5/2019 | Nostry et al. | |
| 11,142,088 | B2 * | 10/2021 | Deshpande | B60L 58/12 |
| 11,307,043 | B2 * | 4/2022 | Gantt, Jr. | G01C 21/3469 |
| 11,447,034 | B2 * | 9/2022 | Staats | B60W 30/188 |
| 11,710,413 | B1 | 7/2023 | Ferrier et al. | |
| 11,719,602 | B2 * | 8/2023 | Seenumani | F02B 63/047 |
| | | | | 701/33.9 |
| 11,981,226 | B2 * | 5/2024 | Sohmshetty | B60L 50/66 |
| 12,005,929 | B2 * | 6/2024 | Park | B60L 53/665 |
| 12,038,769 | B2 * | 7/2024 | Lane | G05D 1/686 |
| 12,067,809 | B2 * | 8/2024 | Braunstein | G01C 21/3469 |
| 12,124,266 | B2 * | 10/2024 | Braunstein | G01C 21/3407 |
| 12,148,311 | B2 * | 11/2024 | Yogesha | G08G 5/57 |
| 12,263,754 | B2 * | 4/2025 | Braunstein | G01R 31/382 |
| 12,275,327 | B2 * | 4/2025 | Staats | B60L 15/42 |
| 2008/0288132 | A1 * | 11/2008 | King | B60W 40/02 |
| | | | | 701/1 |
| 2010/0094496 | A1 * | 4/2010 | Hershkovitz | B60L 50/66 |
| | | | | 701/22 |
| 2012/0296512 | A1 * | 11/2012 | Lee | H01M 10/48 |
| | | | | 701/29.3 |
| 2012/0316717 | A1 * | 12/2012 | Daum | B60L 55/00 |
| | | | | 701/22 |
| 2013/0046457 | A1 * | 2/2013 | Pettersson | B60L 58/12 |
| | | | | 701/1 |
| 2013/0079962 | A1 * | 3/2013 | Ishikawa | B60L 15/2045 |
| | | | | 701/22 |
| 2015/0039391 | A1 * | 2/2015 | Hershkovitz | G01R 31/382 |
| | | | | 705/7.31 |
| 2016/0011592 | A1 * | 1/2016 | Zhang | B64U 70/97 |
| | | | | 244/114 R |
| 2018/0186357 | A1 * | 7/2018 | Deshpande | B60W 30/188 |
| 2019/0193711 | A1 * | 6/2019 | Deshpande | B60L 58/12 |
| 2020/0070801 | A1 * | 3/2020 | Staats | B60L 53/53 |
| 2020/0130864 | A1 * | 4/2020 | Brockers | B60L 53/12 |
| 2020/0164760 | A1 * | 5/2020 | Sohmshetty | B60L 53/80 |
| 2020/0271470 | A1 * | 8/2020 | Symanow | B60W 20/12 |
| 2020/0320446 | A1 | 10/2020 | Dahl et al. | |
| 2020/0333148 | A1 | 10/2020 | Qiu et al. | |
| 2020/0386561 | A1 * | 12/2020 | Namiki | B60L 53/80 |
| 2020/0393259 | A1 * | 12/2020 | Gantt, Jr. | G01C 21/3469 |
| 2021/0103860 | A1 | 4/2021 | De Oliveira et al. | |
| 2021/0407303 | A1 * | 12/2021 | Yogesha | G06V 20/17 |
| 2022/0107191 | A1 * | 4/2022 | Diamond | G06Q 50/40 |
| 2022/0343771 | A1 | 10/2022 | Schwindt | |
| 2022/0348107 | A1 * | 11/2022 | Hajimiri | B60L 53/80 |
| 2022/0348108 | A1 * | 11/2022 | Hajimiri | B60L 53/80 |
| 2022/0402399 | A1 * | 12/2022 | Staats | B60L 50/53 |
| 2023/0166619 | A1 | 6/2023 | Dow | |
| 2023/0166632 | A1 * | 6/2023 | Braunstein | G01R 31/382 |
| | | | | 320/109 |
| 2023/0168684 | A1 * | 6/2023 | Braunstein | G01C 21/3407 |
| | | | | 701/25 |
| 2023/0168696 | A1 * | 6/2023 | Lane | B60L 58/13 |
| | | | | 701/25 |
| 2023/0196846 | A1 * | 6/2023 | Braunstein | G07C 5/0808 |
| 2023/0278458 | A1 * | 9/2023 | Li | B60L 53/305 |
| | | | | 180/65.1 |
| 2023/0302955 | A1 | 9/2023 | Pereira et al. | |
| 2024/0067038 | A1 * | 2/2024 | Dowling | G01C 21/3469 |
| 2024/0166072 | A1 * | 5/2024 | Young | B60L 3/12 |
| 2024/0361137 | A1 * | 10/2024 | Aviv | B60L 58/12 |
| 2024/0391352 | A1 * | 11/2024 | Abbaraju | G01R 31/3648 |
| 2025/0042294 | A1 * | 2/2025 | Balasubramanian | |
| | | | | G01C 21/3697 |
| 2025/0252855 | A1 * | 8/2025 | Averkova | G08G 5/58 |
| 2025/0271274 | A1 * | 8/2025 | Narayanan | G01C 21/3682 |

FOREIGN PATENT DOCUMENTS

| | | | | |
|---|---|---|---|---|
| EP | 3923260 | A1 | 12/2021 | |
| EP | 4290182 | A1 * | 12/2023 | G01C 21/3407 |
| EP | 4344925 | A1 * | 4/2024 | B60L 53/80 |
| EP | 4290182 | B1 * | 7/2025 | G06Q 50/40 |
| JP | 2014-003803 | A | 1/2014 | |
| KR | 20180021504 | A * | 3/2018 | B60L 11/1851 |
| WO | WO-2012174009 | A2 * | 12/2012 | B60K 6/46 |
| WO | WO-2013108246 | A2 * | 7/2013 | B60L 15/2045 |
| WO | 2019/073742 | A1 | 4/2019 | |
| WO | WO-2024018448 | A2 * | 1/2024 | G06Q 10/047 |
| WO | WO-2025101181 | A1 * | 5/2025 | B60L 53/67 |

OTHER PUBLICATIONS

Extended European Search Report Mailed on Sep. 22, 2025 for EP Application No. 25156333, 11 page(s).

* cited by examiner

1000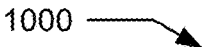

1003

OBTAINING TRAVEL PATHWAY

1006

OBTAINING VEHICLE STATION DATASET

1009

OBTAINING CURRENT BATTERY STATUS OF VEHICLE

1012

OBTAINING PAYLOAD DATASET

1015

GENERATING REQUIRED BATTERY LEVELS FOR LEGS OF TRAVEL PATHWAY

1018

GENERATING ESTIMATED REMAINING BATTERY LEVELS FOR LEGS OF TRAVEL PATHWAY

1021

GENERATING INDICATIONS FOR ONE OR MORE ADJUSTMENT OPERATIONS

1024

RENDERING A GRAPHICAL USER INTERFACE COMPRISING ONE OR MORE INDICATIONS FOR ADJUSTMENT OPERATIONS

1027

CONTROLLING VEHICLE BASED AT LEAST IN PART ON ONE OR MORE ADJUSTMENT OPERATIONS

FIG. 10

APPARATUSES, COMPUTER-IMPLEMENTED METHODS, AND COMPUTER PROGRAM PRODUCTS FOR ENERGY-BASED TRAVEL PATHWAY PLANNING

CROSS REFERENCE TO RELATED APPLICATIONS

This application claims the benefit of and priority to India Provisional Application No. 202411014535, filed Feb. 28, 2024, entitled "APPARATUSES, COMPUTER-IMPLE-MENTED METHODS, AND COMPUTER PROGRAM PRODUCTS FOR ENERGY-BASED TRAVEL PATHWAY PLANNING," the disclosure of which is incorporated herein by reference in its entirety.

TECHNOLOGICAL FIELD

Embodiments of the present disclosure are generally directed to improving travel pathway planning based at least in part on vehicle battery performance.

BACKGROUND

Vehicle missions may include multiple leg and each leg may be associated with varying payload requirements. In traversing a travel pathway, a vehicle may be limited to a maximum distance and/or number of legs based on an energy capacity, such as a battery level. A vehicle may undergo battery charging along the travel pathway to increase the possible travel distance and/or number of legs. In such instances, overcharging of the vehicle battery may reduce battery efficiency, while undercharging of the vehicle battery may reduce safety. Existing approaches to travel pathway generation may fail to optimize for battery health and, as a result, operational efficiency of vehicles and missions may be reduced.

Applicant has discovered various technical problems associated with generating optimal travel pathways. Through applied effort, ingenuity, and innovation, Applicant has solved many of these identified problems by developing the embodiments of the present disclosure, which are described in detail below.

BRIEF SUMMARY

In general, embodiments of the present disclosure herein provide for performing travel pathway planning based at least in part on vehicle battery performance. For example, embodiments of the present disclosure provide for generating required battery levels and estimated remaining battery levels for traversal of a vehicle along a sequence of legs of a travel pathway. Further, embodiments of the present disclosure provide for determining whether to perform one or more adjustment operations to ensure mission completion, improve battery efficiency, maintain battery health, and/or the like. Various embodiments of the present disclosure may cause rendering of GUIs including indications for performing one or more adjustment operations. Further, embodiments of the present disclosure may control operation of the vehicle based at least in part on the required battery levels, estimated remaining levels, adjustment operation indications, and/or the like.

As one example, the descried method, apparatus, or computer program product may determine one or more points along a travel pathway at which to charge or swap a battery of the vehicle. The one or more points may be presented to an operator of the vehicle via rendering of a GUI including intuitive symbology that represents the legs of the travel pathway, respective vehicle stations associated with each leg, and adjustment operations that may be performed at a particular vehicle station. In doing so, the present method, apparatus, and computer program product may overcome technical challenges associated with optimizing travel pathway planning and mission execution toward preserving battery health and efficiently expending mission resources and infrastructure. Other implementations for energy-based travel pathway planning and mission execution will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, a computer-implemented method for energy-based travel pathway planning is provided. The computer-implemented method is executable utilizing any of a myriad of computing device(s) and/or combinations of hardware, software, firmware. In some example embodiments an example computer-implemented method includes obtaining travel pathway data for a vehicle, the travel pathway data defining a sequence of legs to travel, wherein each leg is associated with a vehicle station; retrieving a vehicle station dataset comprising vehicle station data for each vehicle station corresponding to at least one leg of the sequence of legs, wherein the vehicle station data for a respective vehicle station comprises at least one vehicle station status reported by an additional vehicle; receiving a current battery status of the vehicle, the current battery status indicative of a battery dissipation rate; receiving a payload dataset comprising respective payload data for each vehicle station; generating, for each particular leg in accordance with the sequence of legs and based at least in part on (i) the current battery status of the vehicle, (ii) the travel pathway data, (iii) at least a portion of the vehicle station dataset, and (iv) at least a portion of the payload dataset, a required battery level for the vehicle to traverse the particular leg in the sequence of legs; generating, for each particular leg in accordance with the sequence of legs and based at least in part on (i) the current battery status of the vehicle, (ii) the travel pathway data, and (iii) at least the portion of the vehicle station dataset, and (iv) at least the portion of the payload dataset an estimated remaining battery level of the vehicle upon arrival at the vehicle station corresponding to the particular leg; generating, based at least in part on (i) the estimated remaining battery levels, (ii) the required battery levels, and (iii) the vehicle station dataset, an indication for each particular vehicle station representing whether to perform at that particular vehicle station at least one adjustment operation; and rendering a graphical user interface (GUI) comprising, for each leg of the sequence of legs, the indication of whether to perform the at least one adjustment operation at the particular vehicle station corresponding to the leg.

In some embodiments, the at least one adjustment operation comprises a swapping of the battery of the vehicle. In some embodiments, the GUI further comprises: a mapping of the plurality of legs and corresponding vehicle stations; and an interface element corresponding to each particular vehicle station, wherein the interface element for each particular vehicle station indicates availability of battery swapping at the particular vehicle station. In some embodiments, the sequence of legs comprises an origin leg, a terminal leg, and an intermediary leg sequenced between the origin leg and the terminal leg; and in response to generating a particular indication to perform the swapping of the battery at the vehicle station corresponding to the intermediary leg, the method further comprises reordering the sequence of travel along the plurality of legs to improve battery efficiency.

In some embodiments, the at least one adjustment operation comprises a payload reduction. In some embodiments, the payload reduction indicates a portion of the payload of the vehicle to leave at the particular vehicle station; and the method further comprises: based at least in part on the payload reduction, updating travel pathway data for a second vehicle, wherein the updated travel pathway data for the second vehicle defines at least one leg for completing delivery of the portion of the payload left at the particular vehicle station.

In some embodiments, the at least one vehicle station status indicates a queue time at the vehicle station. In some embodiments, the at least one vehicle station status indicates turbulence at the vehicle station. In some embodiments, the at least one vehicle station status indicates availability of charging infrastructure at the vehicle station. In some embodiments, the payload data comprises at least one of a quantity of passengers or an amount of cargo to be transported by the vehicle to or from the corresponding vehicle station in the sequence of legs. In some embodiments, the at least one adjustment operation comprises an increase to a charging duration of the battery of the vehicle at the particular vehicle station.

In some embodiments, the indication of whether to perform the at least one adjustment operation at the particular vehicle station comprises an updated charging duration. In some embodiments, the at least one vehicle station status indicates availability of battery swapping at the vehicle station. In some embodiments, the at least one vehicle station status indicates availability of maintenance personnel at the vehicle station. In some embodiments, the travel pathway data comprises a battery safety margin for the travel pathway. In some embodiments, the travel pathway data comprises a respective layover interval for personnel at the vehicle station at each leg. In some embodiments, the at least one vehicle station status indicates vehicle traffic density at the vehicle station. In some embodiments, the at least one vehicle station status indicates at least one of a wind condition or a precipitation condition at the vehicle station.

In accordance with another aspect of the present disclosure, a computing apparatus for energy-based travel pathway planning is provided. The computing apparatus in some embodiments includes at least one processor and at least one non-transitory memory, the at least non-transitory one memory having computer-coded instructions stored thereon. The computer-coded instructions in execution with the at least one processor causes the apparatus to perform any one of the example computer-implemented methods described herein. In some other embodiments, the computing apparatus includes means for performing each step of any of the computer-implemented methods described herein.

In accordance with another aspect of the present disclosure, a computer program product for energy-based travel pathway planning is provided. The computer program product in some embodiments includes at least one non-transitory computer-readable storage medium having computer program code stored thereon. The computer program code in execution with at least one processor is configured for performing any one of the example computer-implemented methods described herein.

BRIEF DESCRIPTION OF THE DRAWINGS

Figure 1:
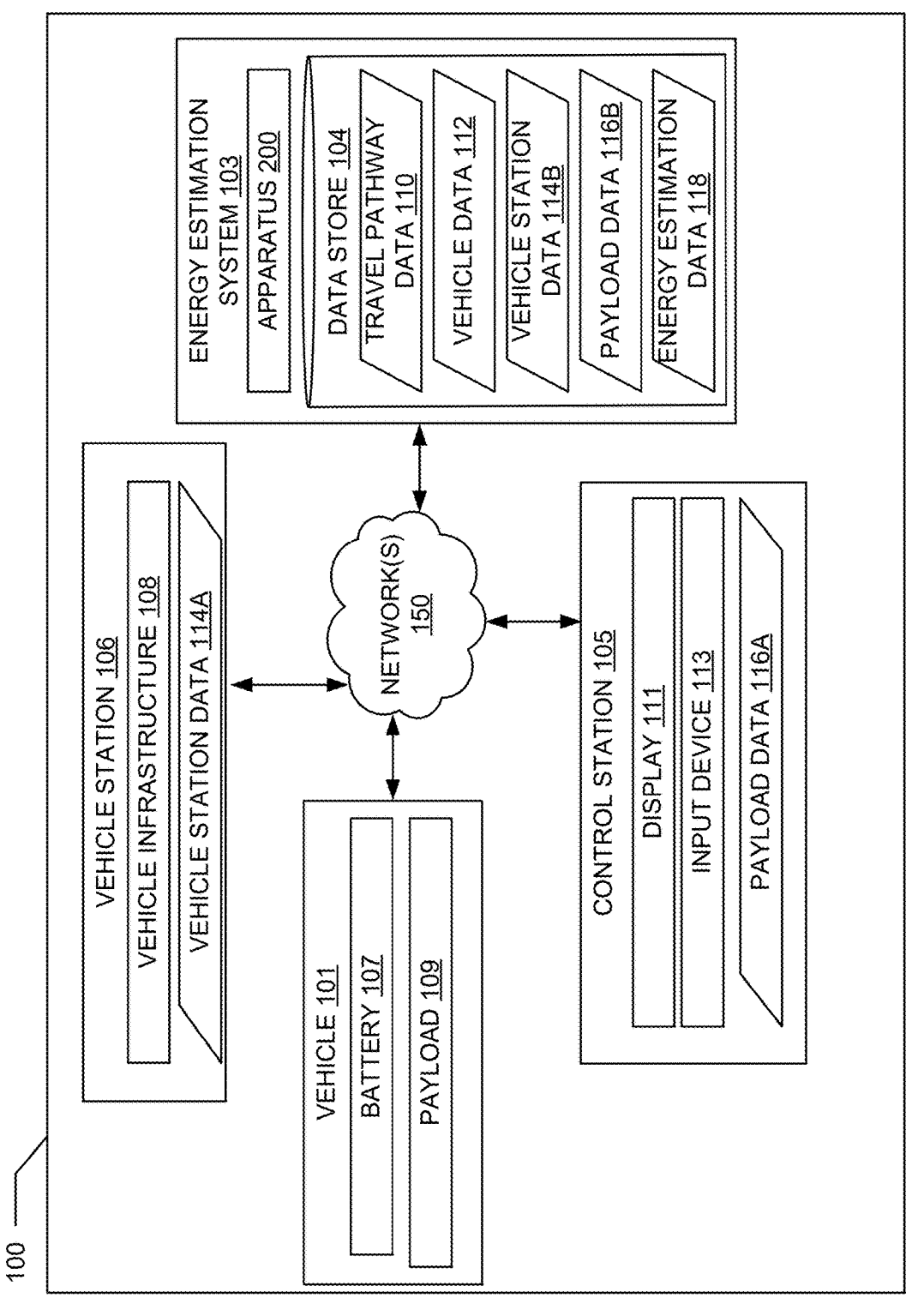

Having thus described the embodiments of the disclosure in general terms, reference now will be made to the accompanying drawings, which are not necessarily drawn to scale, and wherein:

FIG. 1 illustrates a block diagram of a networked environment that may be specially configured within which embodiments of the present disclosure may operate.

Figure 2:
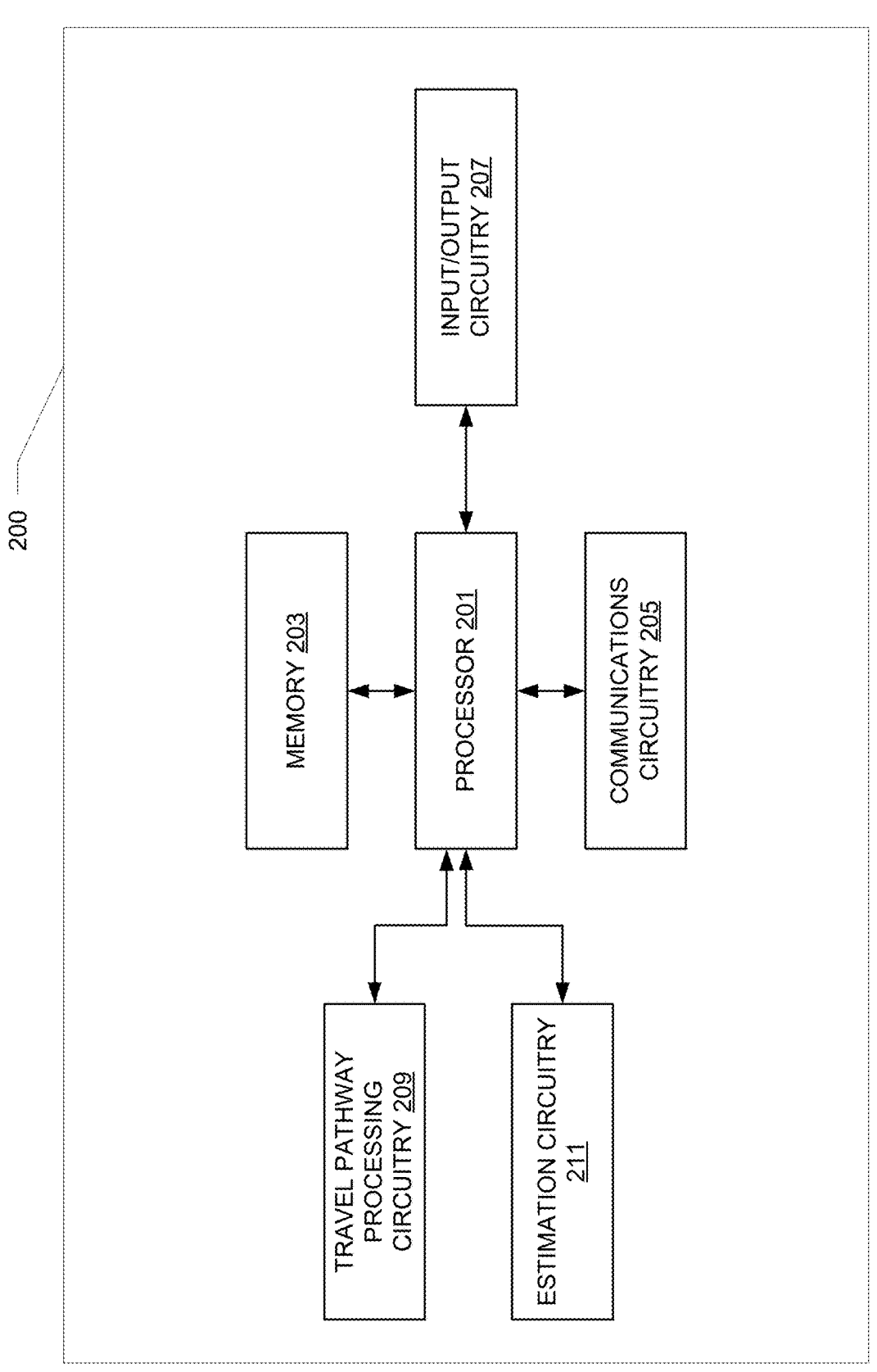

FIG. 2 illustrates a block diagram of an example apparatus that may be specially configured in accordance with at least some example embodiments of the present disclosure.

Figure 3:
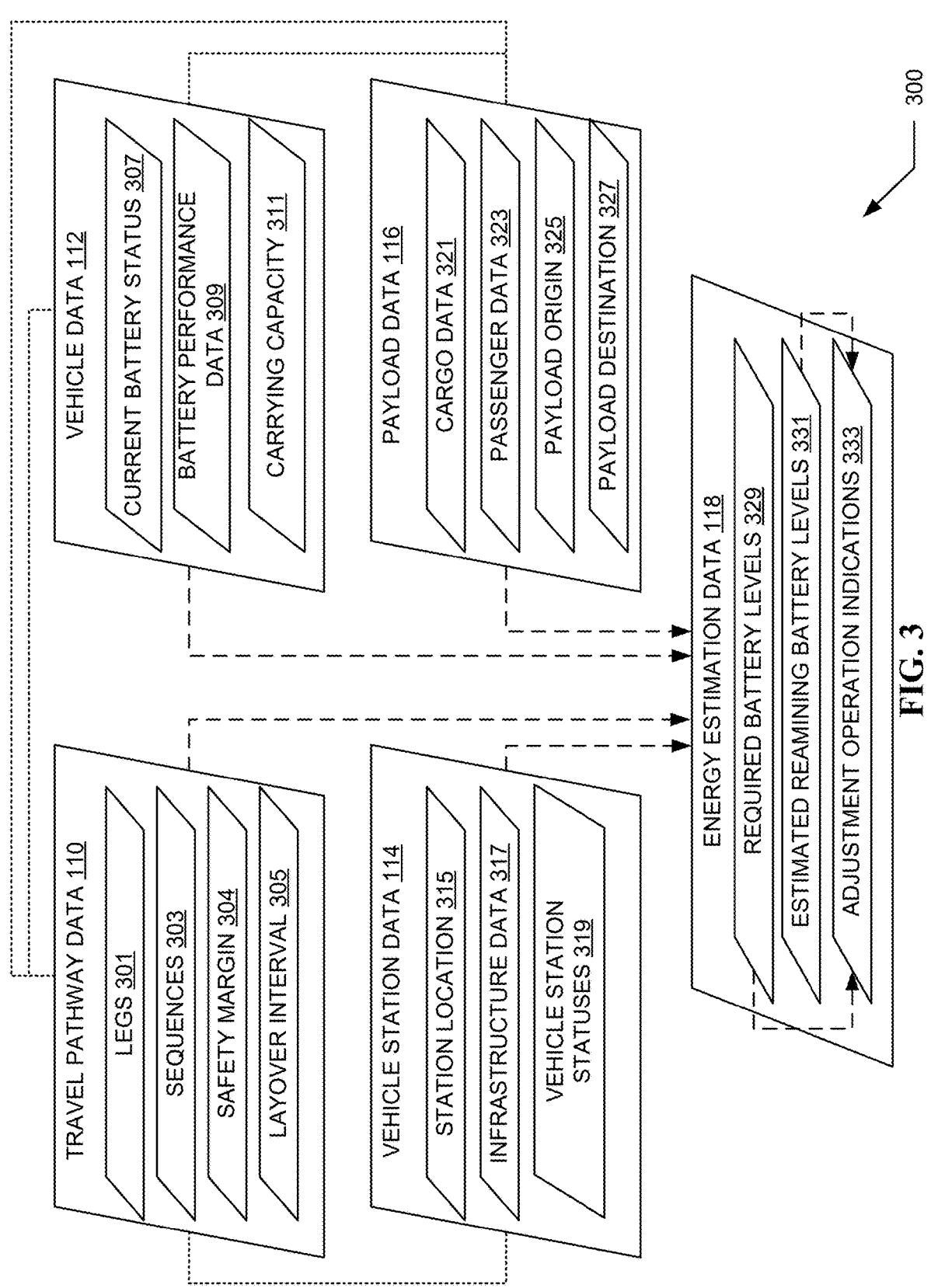

FIG. 3 illustrates an example data architecture in accordance with at least some example embodiments of the present disclosure.

Figure 4:
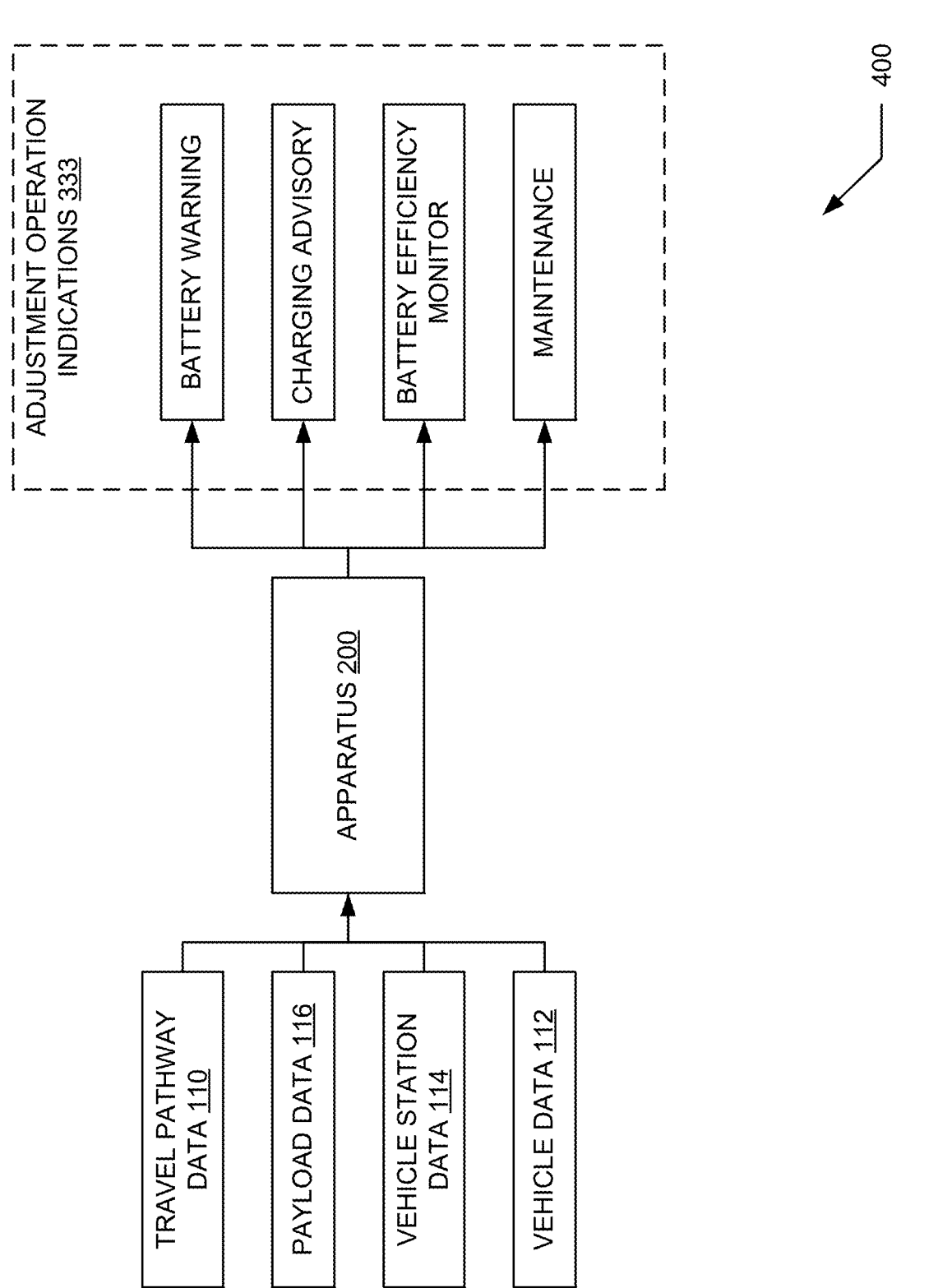

FIG. 4 illustrates an example workflow for travel pathway planning in accordance with at least some example embodiments of the present disclosure.

Figure 5:
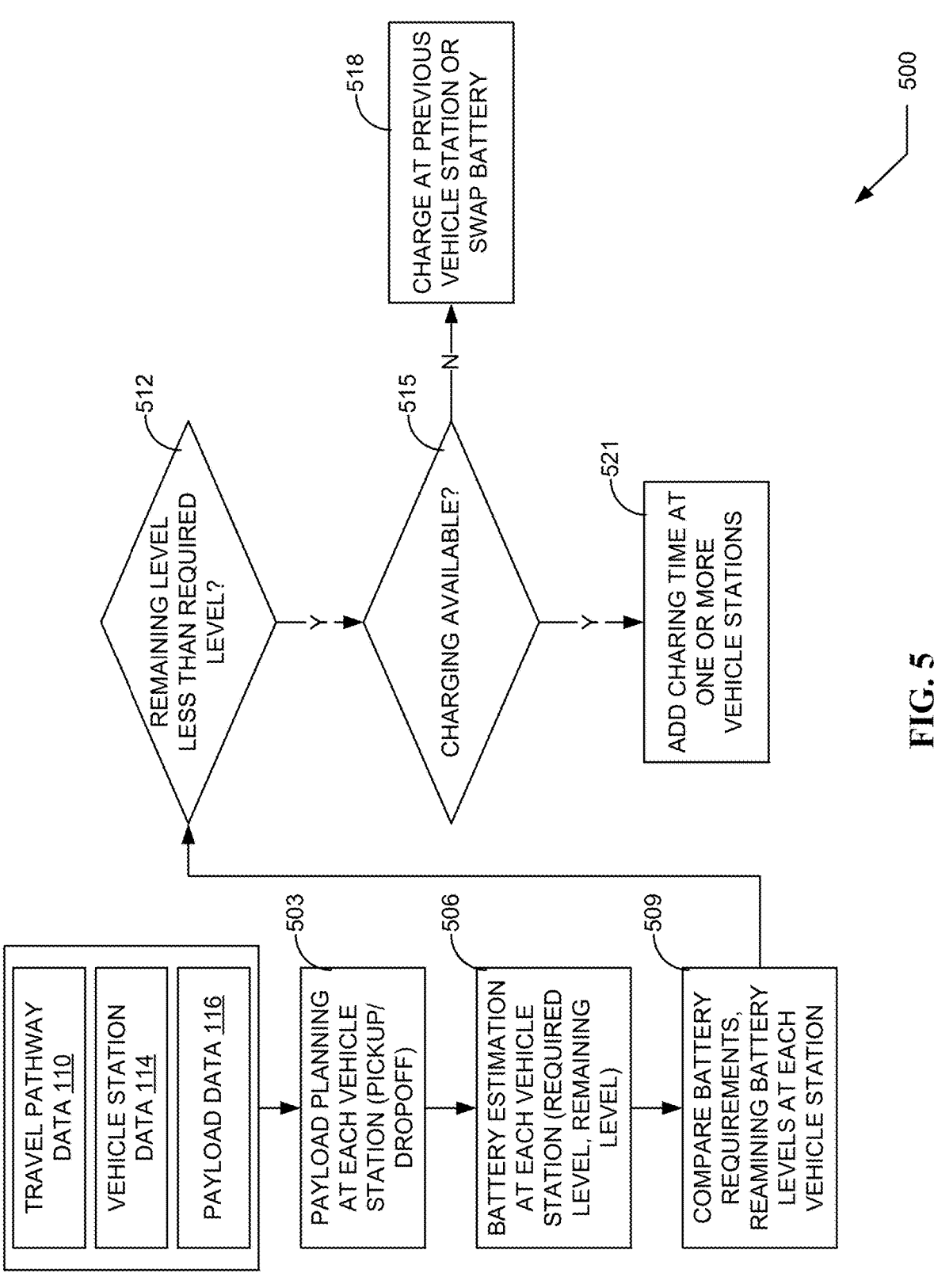

FIG. 5 illustrates an example workflow for travel pathway planning in accordance with at least some example embodiments of the present disclosure.

Figure 6:
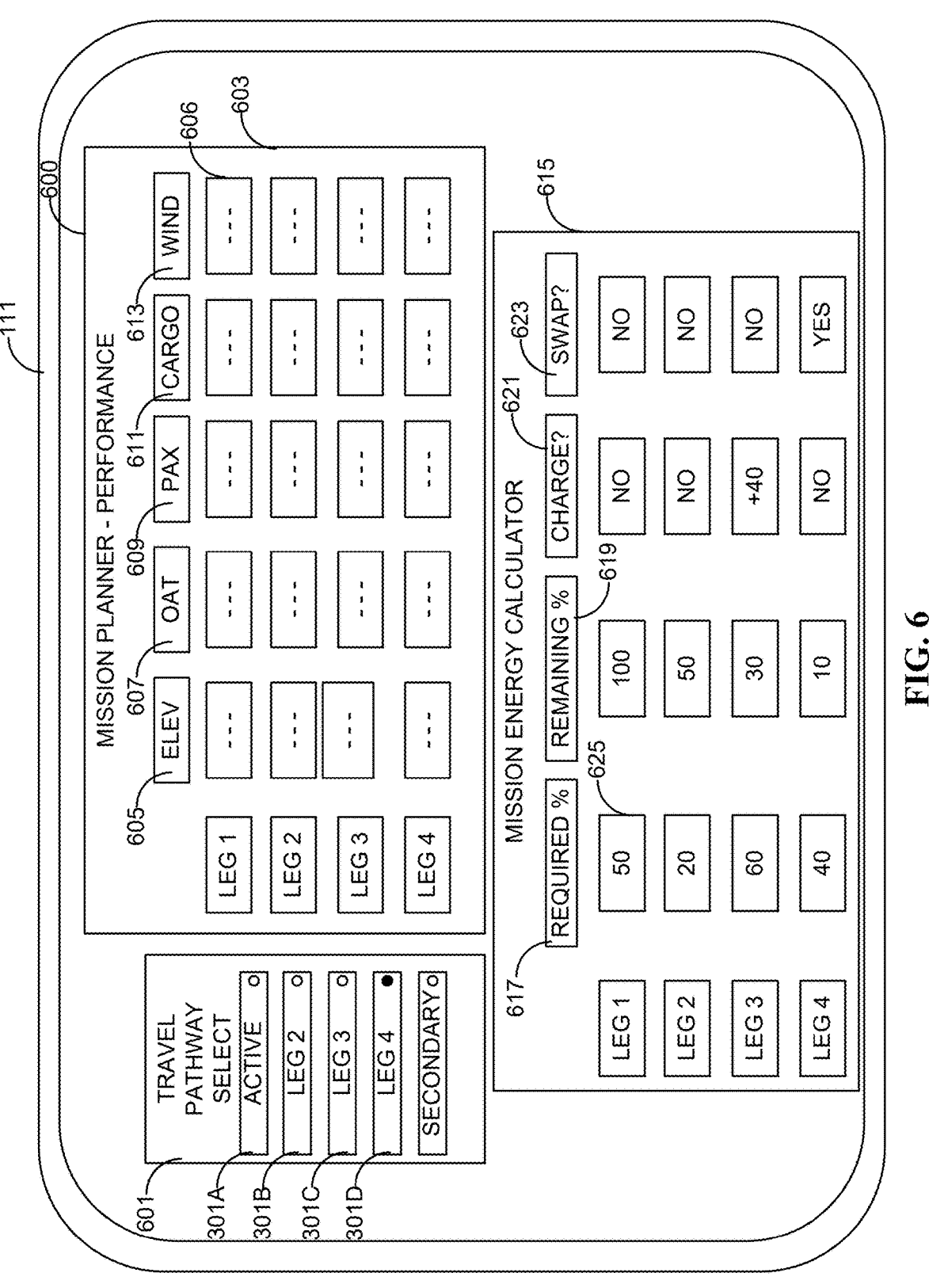

FIG. 6 illustrates an example control station display including a graphical user interface (GUI) for performing travel pathway generation in accordance with at least some example embodiments of the present disclosure.

Figure 7:
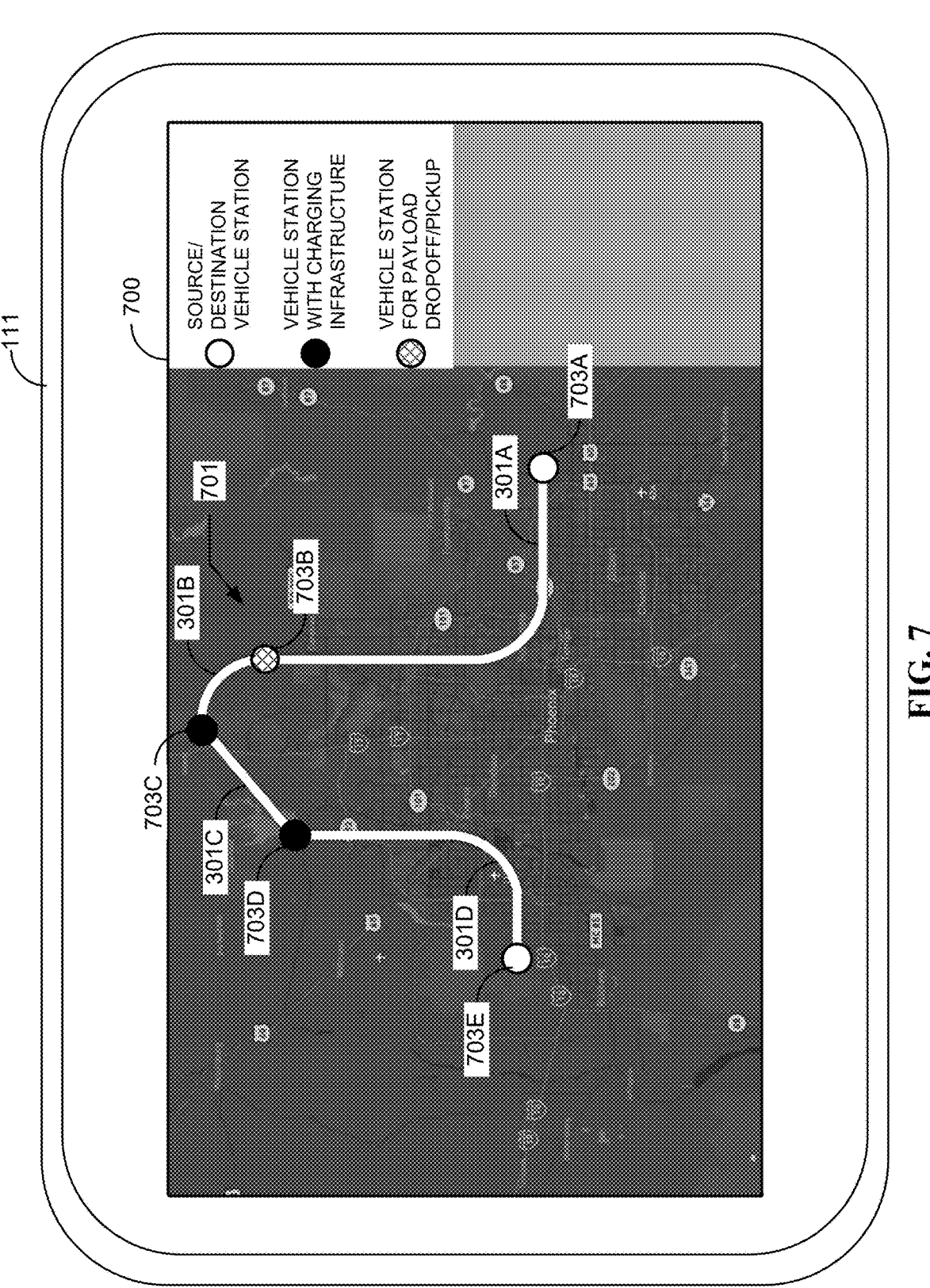

FIG. 7 illustrates an example control station display having rendered thereon a GUI comprising a travel pathway generated in accordance with at least some example embodiments of the present disclosure.

Figure 8:
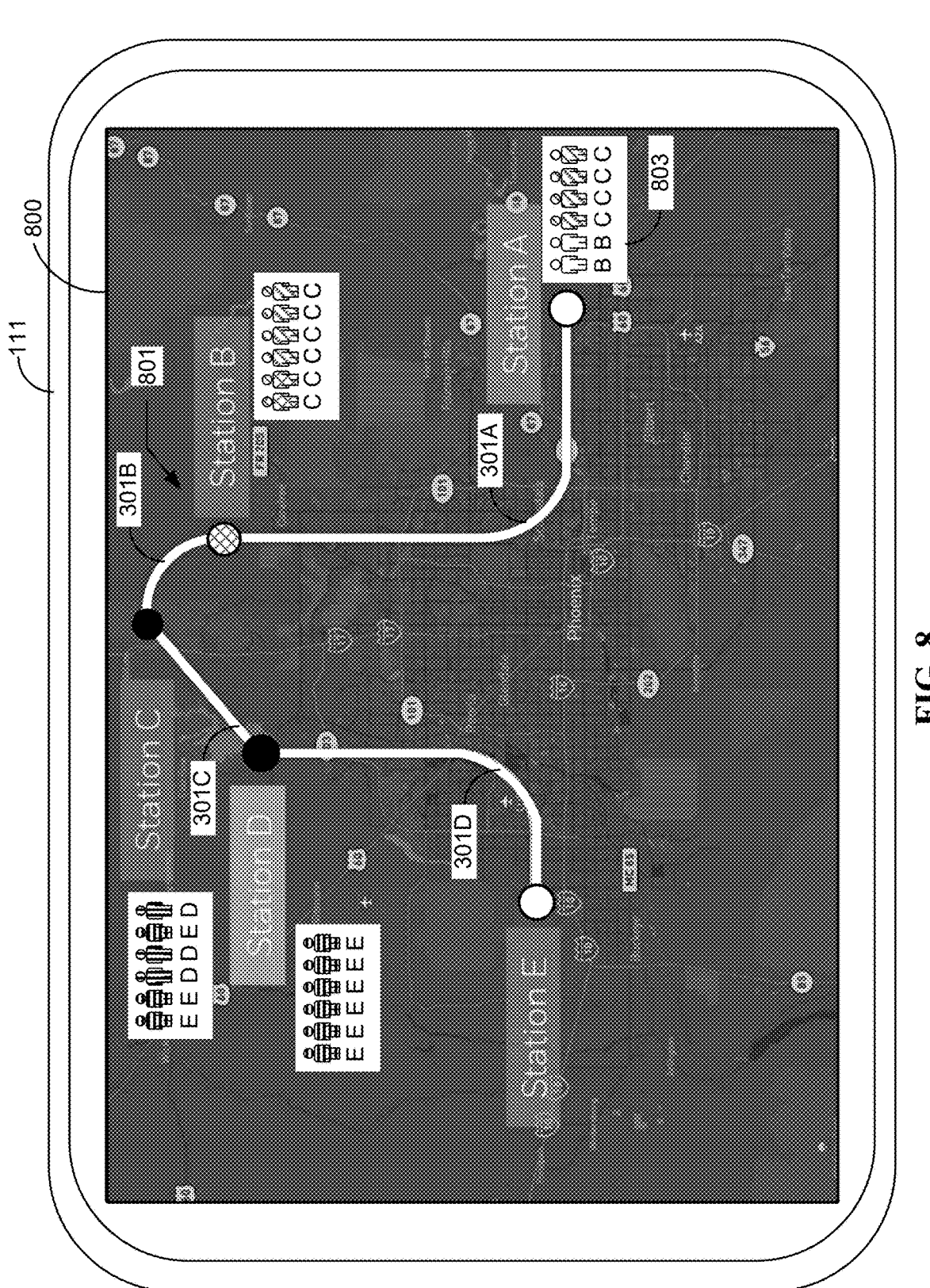

FIG. 8 illustrates an example control station display having rendered thereon a GUI comprising a travel pathway generated in accordance with at least some example embodiments of the present disclosure.

Figure 9:
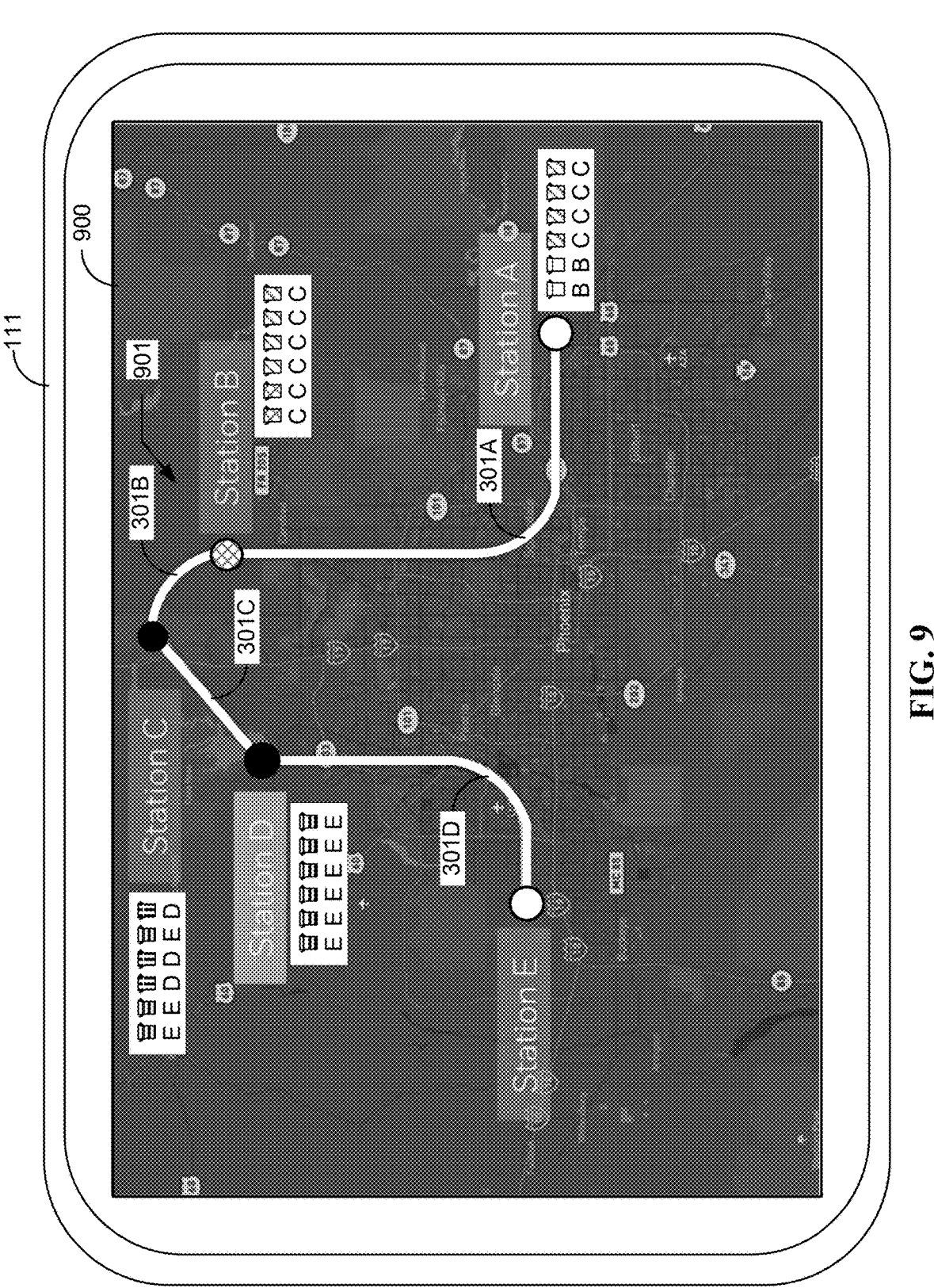

FIG. 9 illustrates an example control station display having rendered thereon a GUI comprising a travel pathway generated in accordance with at least some example embodiments of the present disclosure.

FIG. 10 illustrates a flowchart depicting operations of an example process for travel pathway planning in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Embodiments of the present disclosure provide a myriad of technical advantages in the technical field of travel pathway planning and mission execution. Typically, travel pathway planning includes limiting vehicle payloads such that a vehicle may deliver one or more subsets of the payload to one or more destinations without stopping to charge or swap the battery of the vehicle. However, such approaches may reduce operational efficiency of vehicle missions due in part to the artificially deflated carrying capacity of the vehicle. Other approaches may include charging the battery at each vehicle station along the travel pathway. For example, a travel pathway may include a plurality of legs and each leg may be associated with an origin vehicle station and a terminal vehicle station. In such approaches, charging may be performed at the original and terminal vehicle stations of each leg. However, frequent and/or excess charging of the battery may reduce battery efficiency and/or waste vehicle resources and infrastructure.

Embodiments of the present disclosure overcome the technical challenges of preserving battery life and efficiently completing vehicle missions by optimizing travel pathway planning based at least in part on battery requirements of the vehicle and energy needs for completing travel pathway legs. The various embodiments of the present disclosure may improve battery life and improve situational awareness during travel pathway planning and execution by generating indications of whether to perform adjustment operations for servicing the battery, reordering travel pathway sequences, adjusting vehicle payloads, and/or the like. The various embodiments may cause the rendering of GUIs comprising travel pathway and adjustment operation information on displays accessible to vehicle operators. In doing so, the situational awareness of the vehicle operator may be improved and increases to operational efficiency and battery life may be obtained.

As one example, in an aerial context, an aerial vehicle may ferry passengers, cargo, and/or the like between vehicle stations. A vehicle mission may include multiple cargo pickup and drop-off destinations, thereby presenting a need to perform sequential travel pathway planning taking into consideration the sequential operation and varying payload masses. Various embodiments of the present method, apparatus, and computer program product may perform travel pathway planning to optimize battery efficiency as the vehicle traverses the sequence of legs in the travel pathway. For example, the method, apparatus, and computer program product may generate estimated battery levels and remaining battery levels of the vehicle respective to traversing each leg in the sequence and further based at least in part on reported battery dissipation rates and a payload carried along each sequence. The method, apparatus, and computer program product may generate indications of whether and where to charge or swap the battery of the vehicle at respective vehicle stations corresponding to the travel pathways legs. In doing so, the method, apparatus, and computer program product may ensure adequate battery capacity for completing each leg without overcharging the battery or discharging the battery below a safety margin. These techniques may improve and/or preserve battery life while simultaneously optimizing operational efficiency of completing the vehicle mission and allocating vehicle resources and infrastructure.

Definitions

"Vehicle" refers to any apparatus that traverses throughout an environment by any mean of travel. In some contexts, a vehicle transports goods, persons, and/or the like, or traverses itself throughout an environment for any other purpose, by means of air, sea, or land. In some embodiments, a vehicle is ground-based, air-based, water-based, space-based (e.g., outer space or within an orbit of a planetary body, a natural satellite, or artificial satellite), and/or the like. In some embodiments, the vehicle is an aerial vehicle capable of air travel. Non-limiting examples of aerial vehicles include urban air mobility vehicles, drones, helicopters, fully autonomous air vehicles, semi-autonomous air vehicles, airplanes, orbital craft, spacecraft, and/or the like.

In some embodiments, the vehicle is piloted by a human operator onboard the vehicle. For example, in an aerial context, the vehicle may be a commercial airliner operated by a flight crew. In some embodiments, the vehicle is remotely controllable such that a remote operator may initiate and direct movement of the vehicle. Additionally, in some embodiments, the vehicle is unmanned. For example, the vehicle may be a powered, aerial vehicle that does not carry a human operator and is piloted by a remote operator using a control station. In some embodiments, the vehicle is an aquatic vehicle capable of surface or subsurface travel through and/or atop a liquid medium (e.g., water, water-ammonia solution, other water mixtures, and/or the like). Non-limiting examples of aquatic vehicles include unmanned underwater vehicles (UUVs), surface watercraft (e.g., boats, jet skis, and/or the like), amphibious watercraft, hovercraft, hydrofoil craft, and/or the like. As used herein, vehicle may refer to vehicles associated with urban air mobility (UAM).

"UAM" refers to urban air mobility, which includes all aerial vehicles and functions for aerial vehicles that are capable of performing vertical takeoff and/or vertical landing procedures. Non-limiting examples of UAM aerial vehicles include passenger transport vehicles, cargo transport vehicles, small package delivery vehicles, unmanned aerial system services, autonomous drone vehicles, and ground-piloted drone vehicles, where any such vehicle is capable of performing vertical takeoff and/or vertical landing.

"Control station" refers to any number of computing device(s) and/or other system(s) embodied in hardware, software, firmware, and/or the like that control, operate, receive and maintain data respective to, and/or monitor one or more vehicles. For example, a control station may include or embody a computing terminal by which one or more vehicles are remotely operated. In some embodiments, the control station includes one or more displays by which data corresponding to one or more vehicles and/or travel pathways is displayed to an operator of the control station. In some embodiments, the control station includes one or more input devices by which instructions or commands for controlling vehicles are received by the control station via user input provided to an input device. In some embodiments, the control station provisions data to an energy estimation system as described herein. The provisioned data may include travel pathway data, vehicle data, vehicle station data, user inputs, and/or the like.

"Vehicle station" refers to any location at which a vehicle may be docked, parked, or otherwise positioned for purposes of loading or unloading payload, performing maintenance, completing crewmember layovers, and/or the like. In some embodiments, a vehicle station includes infrastructure for performing maintenance including charging a vehicle battery, swapping a vehicle battery, and/or the like. Additionally, or alternatively, in some embodiments, a vehicle station is configured to receive or provide a payload from or to a vehicle. For example, a vehicle station may include infrastructure for providing or receiving cargo to or from a vehicle. In another example, a vehicle station include infrastructure for loading or unloading passengers to or from a vehicle. In some embodiments, in an aerial context, a vehicle station embodies a vertiport, a vertistop, and/or the like. For example, in an aerial context, a vehicle station may embody a vertiport comprising an area of land and/or structures used for electric, hydrogen, and hybrid vertical takeoff and landing (VTOL) and performance of vehicle maintenance. The vertiport may include building, facilities, resources, personnel, or other infrastructure for maintaining a vehicle including charging vehicle batteries, swapping vehicle batteries, and/or the like. As another example, in an aerial context, a vertistop may embody an area of land and/or structures used for VTOL and loading and unloading of payloads to and from vehicles. In some contexts, the vertistop may exclude infrastructure for performing vehicle maintenance including battery charging and battery swapping. In various embodiments, the present method, apparatus, and computer program product render graphical user interfaces comprising symbology for indicating and differentiating between vehicle stations configured for performing vehicle maintenance and vehicle stations configured for payload management.

Example Systems and Apparatuses of the Disclosure

FIG. 1 illustrates a block diagram of a networked environment that may be specially configured within which embodiments of the present disclosure may operate. Specifically, FIG. 1 depicts an example networked environment 100. As illustrated, the networked environment 100 includes one or more vehicles 101, an energy estimation system 103, one or more control stations 105, one or more vehicle stations 106 and/or the like. In some embodiments, the energy estimation system 103 is configured to process a travel pathway to generate an optimal sequence of travel along the travel pathway, indications for one or more adjustment operations to be performed along the travel pathway, and/or the like. In some embodiments, the energy estimation system 103 generates energy estimation data 118. For example, the energy estimation system 103 may generate required battery levels, estimated remaining battery levels, indications for adjustment operations, and/or the like. In various embodiments, the energy estimation system 103 is configured to carry out processes and workflows described herein to improve travel pathway planning based at least in part on energy required by a vehicle to perform a mission represented by the travel pathway. For example, the energy estimation system 103 may perform a travel pathway planning workflows 400, 500 as shown in FIGS. 4 and 5, respectively, and described herein. As another example, the energy estimation system 103 may perform a travel pathway planning process 1000 as shown in FIG. 10 and described herein.

In some embodiments, the energy estimation system 103 is configured to generate required battery levels for a vehicle 101 to complete a plurality of legs of a travel pathway according to a sequence. For example, the energy estimation system 103 may generate, for each particular leg in accordance with a sequence of legs and based at least in part on vehicle data 112, travel pathway data 110, vehicle station data 114, and payload data 116, a required battery level for the vehicle 101 to traverse the particular leg in the sequence of legs. In some embodiments, the energy estimation system 103 is configured to generate an estimated remaining battery level of a vehicle upon arrival of the vehicle at a particular vehicle station 106 corresponding to a leg of the travel pathway. For example, the energy estimation system 103 may generate, for each particular leg in accordance with a sequence of legs and based at least in part on vehicle data 112, travel pathway data 110, vehicle station data 114, and payload data 116 an estimated remaining battery level of the vehicle upon arrival at the vehicle station 106 corresponding to the particular leg.

In some embodiments, the energy estimation system 103 is configured to generate indications for one or more adjustment operations to be performed respective to a travel pathway, one or more particular legs of a travel pathway, or a respective vehicle station 106 corresponding to a particular leg of the travel pathway. For example, the energy estimation system may generate, based at least in part on estimated remaining battery levels, required battery levels, vehicle station data 114, payload data 116, and/or the like, an indication for each particular vehicle station representing whether to perform at that particular vehicle station at least one adjustment operation. In some embodiments, the energy estimation system 103 is configured to render graphical user interfaces (GUIs) on displays of one or more vehicles 101, control stations 105, vehicle stations 106, and/or the like. In some contexts, a GUI includes a travel pathway and, for each leg of a travel pathway, an indication of whether to perform one or more adjustment operations at a particular vehicle station corresponding to the leg. In various embodiments, the energy estimation system 103 generates and causes rendering of the GUIs 600, 700, 800, 900 as shown in FIGS. 6, 7, 8, and 9, respectively, and described herein.

In some embodiments, the energy estimation system 103 modifies a travel pathway to include indications of adjustment operations. For example, the energy estimation system 103 may modify a travel pathway to include an indication to charge a battery of a vehicle 101 at a particular vehicle station 106 for a determined charging duration or until the battery reaches a determined level. As another example, the energy estimation system 103 may modify a travel pathway to reorder a sequence of legs of the travel pathway toward improving battery efficiency, maintaining battery health, and/or the like. In some embodiments, the energy estimation system 103 generates an indication to modify a payload of the vehicle 101 at one or more vehicle stations corresponding to one or more legs of the travel pathway. For example, based at least in part on one or more required battery levels, estimated remaining battery levels, battery safety margins, and/or the like, the energy estimation system 103 may generate an indication to leave a portion of a payload at a particular vehicle station corresponding to a leg of the travel pathway or load additional payload at a particular vehicle station.

In some embodiments, the energy estimation system 103 includes an apparatus 200 configured to perform various functions and actions related to enacting techniques and processes described herein for performing energy-based travel pathway planning. For example, the apparatus 200 may perform a travel pathway planning workflows 400, 500 as shown in FIGS. 4 and 5, respectively, and described herein. As another example, the apparatus 200 may perform a travel pathway planning process 1000 as shown in FIG. 10 and described herein. In various embodiments, the apparatus 200 generates and causes rendering of the GUIs 600, 700, 800, 900 as shown in FIGS. 6, 7, 8, and 9, respectively, and described herein. In some embodiments, the energy estimation system 103 is configured to provide data to and receive data from one or more vehicles 101, control stations 105, vehicle stations 106, and/or the like via the apparatus 200.

In some embodiments, the energy estimation system 103 includes one or more data stores 104. The various data in the data store 104 may be accessible to the apparatus 200, control station 105, vehicle station 106, and/or the like. The data store 104 may be representative of a plurality of data stores 104 as can be appreciated. The data stored in the data store 104, for example, is associated with the operation of the various applications, apparatuses, and/or functional entities described herein. The data stored in the data store 104 may include, for example, travel pathway data 110, vehicle data 112, vehicle station data 114B, payload data 116B, energy estimation data 118, and/or the like. In some embodiments, the data store 104 stores data from one or more vehicles 101, control stations 105, vehicle stations 106, and/or the like.

In some embodiments, the apparatus 200 is configured to receive vehicle station data, payload data, vehicle data, travel pathway data, and/or the like from one or more vehicles 101, control stations 105, vehicle stations 106, and/or the like. For example, the control station 105 may store and provision to the apparatus 200 payload data 116A, where the payload data 116A may be associated with a set of travel pathway data 110. In another example, the vehicle station 106 may store and provision to the apparatus 200 vehicle station data 114A. In still another example, the apparatus 200 may receive a current battery level, vehicle location, vehicle speed, or other vehicle data 112 from a vehicle 101, control station 105, vehicle station 106, and/or the like.

In some embodiments, travel pathway data 110 includes data associated with a travel pathway, where the travel pathway defines a course of travel for a vehicle 101. In some embodiments, the travel pathway data 110 includes a plurality of legs and a sequence of travel along the plurality of legs. In some embodiments the travel pathway data 110 includes vehicle datasets associated with respective missions, vehicles 101, control stations 105, and/or the like. In some embodiments, the travel pathway data 110 includes one or vehicle identifiers, control station identifiers, vehicle station identifiers, and/or the like for vehicles 101, control stations 105, vehicle stations 106, and/or the like, that are associated with traversing the travel pathway. In some embodiments, the travel pathway data 110 includes metadata including safety margins, layover intervals, departure times, arrival times, payload identifiers, and/or the like.

In some embodiments, vehicle data 112 includes data associated with one or more vehicles 101. In some embodiments the vehicle data 112 includes vehicle datasets associated with respective vehicles 101. In some embodiments, the vehicle data 112 includes a vehicle identifier, control station identifier, battery data, performance data, vehicle location data, and/or the like. For example, the vehicle data 112 may include a type of battery used by a vehicle 101, current battery status (e.g., current battery level, battery dissipation rate, and/or the like), battery status, battery charging duration, battery efficiency policies, maintenance records, and/or the like. As another example, the vehicle data 112, may include a carrying capacity of the vehicle 101, a range of the vehicle 101, a current location of the vehicle 101, and/or the like. In some embodiments, the vehicle data 112 (or travel pathway data 110) indicates one or more control stations 105 assigned to control the vehicle 101 along a travel pathway.

In some embodiments, the vehicle station data 114A, B includes data associated with a vehicle station 106. In some embodiments the vehicle station data 114A, B includes vehicle station datasets associated with respective vehicle stations 106. In some embodiments, the vehicle station data 114A, B indicates a location of the vehicle station. In some embodiments, the vehicle station data 114A, B (or travel pathway data 110) includes an associated between one or more legs of a travel pathway and one or more vehicle stations 106. In some embodiments, the vehicle station data 114A, B indicates infrastructure at a respective vehicle station 106 including battery charging infrastructure, battery swapping infrastructure, payload processing infrastructure, and/or the like. In some embodiments, the vehicle station data 114A, B includes one or more vehicle station statuses that indicate current capabilities, conditions, and/or the like of a vehicle station 106. For example, the vehicle station data 114A, B may include queue times, turbulence or other weather conditions, battery infrastructure availability, personnel availability, vehicle traffic density, and/or the like.

In some embodiments, the payload data 116A, B includes data associated with a payload to be carried by or currently being carried by a vehicle 101. In some embodiments, the payload data 116A, B includes respective payload datasets associated with particular vehicles 101, travel pathways, control stations 105, vehicle stations 106, and/or the like. In some embodiments, the payload data 116A, B includes payload masses, volumes, packing densities, and/or the like. For example, a payload dataset may indicate an amount of cargo, quantity of passengers, average passenger mass, and/or the like. In some embodiments, the payload data 116A, B includes origins and destinations for respective payloads. For example, a payload dataset may indicate a leg of a travel pathway at which the payload is to be loaded onto a vehicle 101 and a second leg of the travel pathway at which the payload is to be unloaded from the vehicle 101, where each leg may be associated with a particular vehicle station 106 at which loading or unloading is performed.

In some embodiments, the energy estimation data 118 includes outputs generated by the energy estimation system 103 as described herein and shown in the accompanying figures. In some embodiments, the energy estimation data 118 includes required battery levels for traversing each of a plurality of legs of a travel pathway according to a sequence. In some embodiments, the energy estimation data 118 includes respective estimated remaining battery levels corresponding to completion of a particular leg of a travel pathway, which may correspond to arrival of a vehicle 101 at a vehicle station 106 associated with the particular leg. In some embodiments, the energy estimation data 118 includes indications for one or more adjustment operations to be performed respective to one or more legs, vehicle stations 106, and/or the like that are associated with a travel pathway. For example, the energy estimation data 118 may include indications for where along a travel pathway to perform battery charging, how long to perform the battery charging, and whether to modify a sequence of traversing one or more legs of the travel pathway.

Additional example aspects of the travel pathway data 110, vehicle data 112, vehicle station data 114A, 114B, payload data 116A, 116b, and energy estimation data 118 are shown in the data architecture 300 depicted in FIG. 3 and described herein.

In some embodiments, the vehicle 101 includes one or more batteries 107 configured to provide power to the vehicle 101 including means for moving the vehicle 101, navigating the vehicle 101, communicating with one or more control stations 105, vehicle stations 106, apparatuses 200, other vehicles, and/or the like. In some embodiments the battery 107 embodies a lithium-ion or lithium polymer battery. Additionally, or alternatively, the battery 107 comprises one or more hydrogen fuel cells. In some embodiments, the vehicle 101 includes means for measuring one or more statuses of the battery 107 including battery level, battery dissipation rate, battery capacity, battery charging or other replenishment rate, battery health, and/or the like. In some embodiments, the vehicle 101 is configured to carry one or more payloads 109. In some embodiments, the payload 109 includes one or more passengers. For example, the vehicle 101 may carry one or more living subjects. Additionally, or alternatively, in some embodiments, the payload 109 includes cargo, such articles, materials, and/or the like. For example, the vehicle 101 may carry one or more packages containing objects. In some embodiments, the vehicle 101 includes means for receiving and providing data from and to the apparatus 200, control station 105, vehicle station 106, and/or the like. For example, the vehicle 101 may include means for providing one or more battery statuses, vehicle station statuses, and/or the like to the apparatus 200, control station 105, vehicle station 106, and/or the like.

In some embodiments, the vehicle 101 is remotely monitored and controlled by one or more control stations 105. In some embodiments, the control station 105 includes one or more displays 111, input devices 113, and/or the like. In some embodiments, the display 111 is configured to render data related to operation of the vehicle 101 including navigating the vehicle 101 along a travel pathway, managing a payload of the vehicle 101, monitoring a battery status of the vehicle 101, and/or the like. For example, the apparatus 200 may cause rendering of GUIs 600, 700, 800, and/or 900, as shown in FIGS. 6, 7, 8, and 9, on the display 111. In some embodiments, the display 111 includes a CRT (cathode ray tube), LCD (liquid crystal display) monitor, LED (light-emitting diode) monitor, and/or the like, for displaying information/data to an operator of the control station 105.

In some embodiments, the control station 105 includes one or more input devices 113 configured to receive user input for monitoring the vehicle 101, controlling the vehicle 101, performing travel pathway planning operations described herein, and/or the like. For example, the input device 113 may receive user inputs for defining a payload of the vehicle 101, vehicle station statuses of one or more vehicle stations 106, statuses of one or more legs of a travel pathway, and/or the like. In another example, the input device 113 may receive user inputs for controlling movement of the vehicle 101 along a travel pathway. In another example, the input device 113 may receive user inputs for communicating with a vehicle station 106, apparatus 200, and/or the like. In some embodiments, the input device 113 includes one or more buttons, cursor devices, joysticks, touch screens, including three-dimensional or pressure-based touch screens, camera, finger-print scanners, accelerometer, retinal scanner, gyroscope, magnetometer, or other input devices. In some embodiments, the input device 113 includes one or more vehicle controls (e.g., joysticks, thumbsticks, yokes, steering wheels, accelerator control, thrust control, brake control, and/or the like) that enable an operator of the control station 105 to navigate the vehicle 101 along the travel pathway and at one or more vehicle stations 106.

In some embodiments, the control station 105 includes means for receiving and storing payload data 116A, travel pathway data 110, vehicle data 112, vehicle station data, energy estimation data, and/or the like. In some embodiments, the control station 105 is configured to provide payload data 116A, travel pathway data 110, vehicle data 112, vehicle station data, and/or the like to the apparatus 200. In some embodiments, the control station 105 is configured to receive vehicle data 112, vehicle station data, and/or the like from one or more vehicles 101, vehicle stations 106, and/or the like.

In some embodiments, the vehicle station 106 includes one or more landing zones at which a vehicle 101 may dock at and depart from the vehicle station. In some embodiments, the vehicle station 106 includes vehicle infrastructure

108 configured to support vehicle operation and missions. In some embodiments, the vehicle infrastructure 108 includes means for charging a battery of the vehicle 101. For example, the vehicle infrastructure 108 may include one or more charging stations, ports, apparatuses, and/or the like. In some embodiments, the vehicle infrastructure 108 includes means for swapping the battery of the vehicle 101. For example, the vehicle infrastructure 108 may include replacement batteries, battery components, and equipment for performing battery swapping. In some embodiments, the vehicle infrastructure 108 includes means for generating and providing one or more vehicle station statuses to a vehicle 101, control station 105, apparatus 200, and/or the like. For example, the vehicle infrastructure 108 may include one or more environment monitoring apparatuses configured to generate measurements of vehicle station elevation, weather at the vehicle station, vehicle traffic density at the vehicle station, availability of charging or swapping infrastructure, availability of maintenance personnel, and/or the like. In some embodiments, the vehicle station 106 includes means for storing data. For example, the vehicle station 106 may include means for storing vehicle station data 114A, payload data 116A, B, vehicle data 112, travel pathway data 110, energy estimation data 118, and/or the like. In some embodiments, the vehicle station 106 includes means for providing and receiving data to and from the apparatus 200, vehicle 101, control station 105, and/or the like. For example, the vehicle station 106 includes means for providing one or more vehicle station statuses to the vehicle 101 to enable provision of the vehicle station statuses to the apparatus 200 and/or a control station 105.

In some embodiments, the energy estimation system 103 (e.g., as embodied by one or more apparatuses 200), vehicles 101, control stations 105, and vehicle stations 106 are communicable over one or more communications network (s), for example the communications network(s) 150. It should be appreciated that the communications network 150 in some embodiments is embodied in any of a myriad of network configurations. In some embodiments, the communications network 150 embodies a public network (e.g., the Internet). In some embodiments, the communications network 150 embodies a private network (e.g., an internal, localized, and/or closed-off network between particular devices). In some other embodiments, the communications network 150 embodies a hybrid network (e.g., a network enabling internal communications between particular connected devices and external communications with other devices). In some embodiments, the communications network 150 embodies a satellite-based communication network. Additionally, or alternatively, in some embodiments, the communications network 150 embodies a radio-based communication network that enables communication between the apparatus 200 and the vehicle 101. For example, the apparatus 200 may receive data from, provision data to, and cause rendering of graphical user interfaces on one or more control stations 105 via one or more communication networks 150. The communications network 150 in some embodiments may include one or more transponders, satellites, base station(s), relay(s), router(s), switch(es), cell tower(s), communications cable(s) and/or associated routing station(s), and/or the like. In some embodiments, the communications network 150 includes one or more user-controlled computing device(s) (e.g., a user owner router and/or modem) and/or one or more external utility devices (e.g., Internet service provider communication tower(s) and/or other device(s)).

Each of the components of the system communicatively coupled to transmit data to and/or receive data from one another over the same or different wireless or wired networks embodying the communications network 150. Such configuration(s) include, without limitation, a wired or wireless Personal Area Network (PAN), Local Area Network (LAN), Metropolitan Area Network (MAN), Wide Area Network (WAN), satellite network, radio network, and/or the like. Additionally, while FIG. 1 illustrate certain system entities as separate, standalone entities communicating over the communications network 150, the various embodiments are not limited to this particular architecture. In other embodiments, one or more computing entities share one or more components, hardware, and/or the like, or otherwise are embodied by a single computing device such that connection(s) between the computing entities are over the communications network 150 are altered and/or rendered unnecessary.

FIG. 2 illustrates a block diagram of an example apparatus 200 that may be specially configured in accordance with at least some example embodiments of the present disclosure. The apparatus 200 may carry out functionality and processes described herein to generate required battery levels, generate estimated remaining battery levels, generate indications to perform adjustment operations, modify travel pathways, render GUIs, and/or the like. In some embodiments, the apparatus 200 includes a processor 201, memory 203, communications circuitry 205, input/output circuitry 207, travel pathway processing circuitry 209, estimation circuitry 211, and/or the like. In some embodiments, the apparatus 200 is configured, using one or more of the processor 201, memory 203, communications circuitry 205, input/output circuitry 207, travel pathway processing circuitry 209, and/or estimation circuitry 211, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, controlling, rendering modifying, restoring, processing, displaying, storing, determining, creating/generating, predicting, monitoring, evaluating, comparing, and/or similar terms used herein interchangeably. In one embodiment, these functions, operations, and/or processes may be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium (s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Additionally, or alternatively, in some embodiments, other elements of the apparatus 200 provide or supplement the functionality of another particular set of circuitry. For example, the processor 201 in some embodiments provides processing functionality to any of the sets of circuitry, the memory 203 provides storage functionality to any of the sets of circuitry, the communications circuitry 205 provides network interface functionality to any of the sets of circuitry, and/or the like.

In some embodiments, the processor 201 (and/or co-processor or any other processing circuitry assisting or otherwise associated with the processor) is/are in communication with the memory 203 via a bus for passing information among components of the apparatus 200. In some embodiments, for example, the memory 203 is non-transitory and may include, for example, one or more volatile and/or non-volatile memories. In other words, for example, the memory 203 in some embodiments includes or embodies an electronic storage device (e.g., a computer readable storage medium). In some embodiments, the memory 203 is configured to store information, data, content, applications, instructions, or the like, for enabling the apparatus 200 to carry out various functions in accordance with example embodiments of the present disclosure (e.g., processing travel pathway data, vehicle data, vehicle station data, payload data, generating estimated and required battery levels, generating indications for performing adjustment operations, and/or the like). In some embodiments, the memory 203 is embodied as a data store 104 as shown in FIG. 1 and described herein. In some embodiments, the memory 203 includes travel pathway data 110, vehicle data 112, vehicle station data 114, payload data 116, energy estimation data 118, and/or the like, as further architected in FIG. 3 and described herein.

The processor 201 may be embodied in a number of different ways. For example, in some embodiments, the processor 201 includes one or more processing devices configured to perform independently. Additionally, or alternatively, in some embodiments, the processor 201 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 201 is configured to execute instructions stored in the memory 203 or otherwise accessible to the processor. Additionally, or alternatively, the processor 201 in some embodiments is configured to execute hard-coded functionality. As such, whether configured by hardware or software methods, or by a combination thereof, the processor 201 represents an entity (e.g., physically embodied in circuitry) capable of performing operations according to an embodiment of the present disclosure while configured accordingly. Additionally, or alternatively, as another example in some example embodiments, when the processor 201 is embodied as an executor of software instructions, the instructions specifically configure the processor 201 to perform the algorithms embodied in the specific operations described herein when such instructions are executed.

As one particular example embodiment, the processor 201 is configured to perform various operations associated with generating optimal travel pathways toward maintaining or improving battery health. In some embodiments, the processor 201 includes hardware, software, firmware, and/or the like, that obtain and store travel pathway data, vehicle data, vehicle station data, and payload data in memory, determine battery dissipation rates, generate GUIs, cause rendering of GUIs on control stations, cause performance of actions respective to a vehicle and/or the like. For example, the processor 201 may generate a GUI comprising a travel pathway and one or more indications to perform a respective adjustment operation at a particular vehicle station corresponding to a leg of the travel pathway. As another example, the processor 201 may cause a control station to navigate the vehicle along a travel pathway according to a modified sequence to improve battery efficiency. As another example, the processor 201 may cause a control station, vehicle station, vehicle, and/or the like to perform maintenance operations (e.g., battery charging or battery swapping), payload management operations (e.g., loading or unloading of all or a portion of a payload), and/or the like based at least in part on output from travel pathway processing circuitry 209, estimation circuitry 211, and/or the like.

In some embodiments, the apparatus 200 includes input/output circuitry 207 that provides output to a user (e.g., an operating entity of control station, vehicle station, and/or the like) and, in some embodiments, receives an indication of a user input. For example, in some contexts, the input/output circuitry 207 provides output to and receives input from one or more control stations, vehicles, vehicle stations, and/or the like. In some embodiments, the input/output circuitry 207 is in communication with the processor 201 to provide such functionality. The input/output circuitry 207 may comprise one or more user interface(s) and in some embodiments includes a display that comprises the interface(s) rendered as a web user interface, an application user interface, a user device, a backend system, or the like. In some embodiments, the input/output circuitry 207 also includes a keyboard, a mouse, a joystick, a touch screen, touch areas, soft keys a microphone, a speaker, and/or other input/output mechanisms. The processor 201 and/or input/output circuitry 207 comprising the processor may be configured to control one or more functions of one or more user interface elements through computer program instructions (e.g., software and/or firmware) stored on a memory accessible to the processor 201 (e.g., memory 203, and/or the like). In some embodiments, the input/output circuitry 207 includes or utilizes a user-facing application to provide input/output functionality to a display of an energy estimation system, control station, vehicle station, vehicle, and/or other display associated with a user.

In some embodiments, the apparatus 200 includes communications circuitry 205. The communications circuitry 205 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry

205 includes, for example, a network interface for enabling communications with a wired or wireless communications network, such as the network 150 shown in FIG. 1 and described herein. Additionally, or alternatively in some embodiments, the communications circuitry 205 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 205 includes circuitry for interacting with the antenna(s) and/or other hardware or software to cause transmission of signals via the antenna(s) or to handle receipt of signals received via the antenna(s). In some embodiments, the communications circuitry 205 enables transmission to and/or receipt of data from one or more vehicles, control stations, vehicle stations, and/or other external computing devices in communication with the apparatus 200.

The travel pathway processing circuitry 209 includes hardware, software, firmware, and/or a combination thereof, that obtain and process travel pathway data, vehicle data, vehicle station data, payload data, energy estimation data and/or the like to generate indications of whether to perform one or more adjustment operations at a vehicle station. For example, in some contexts, the travel pathway processing circuitry 209 includes hardware, software, firmware, and/or the like, that process required battery levels, estimated remaining battery levels, vehicle station data, payload data, and/or the like to determine whether to perform battery swapping, battery charging, and/or the like at one or more vehicle stations corresponding to one or more legs of a travel pathway. As another example, the travel pathway processing circuitry 209 includes hardware, software, firmware, and/or the like, that determine whether to increase a charging duration at a particular vehicle station corresponding to a leg of a travel pathway. In another example, the travel pathway processing circuitry 209 includes hardware, software, firmware, and/or the like, that generate a reordered sequence of legs of a travel pathway to improve battery efficiency. In still another example, the travel pathway processing circuitry 209 includes hardware, software, firmware, and/or the like, that determine a subset of a payload to leave at a vehicle station of a particular leg of a travel pathway.

In some embodiments, the travel pathway processing circuitry 209 includes hardware, software, firmware, and/or the like, that obtain and process vehicle station statuses from vehicles, control stations, vehicle stations, and/or the like. For example, the travel pathway processing circuitry 209 may include hardware, software, firmware, and/or the like, that process a vehicle status indicative of charging infrastructure availability, battery swapping availability, maintenance personnel availability, and/or the like for a particular vehicle station. In some embodiments, the travel pathway processing circuitry 209 includes hardware, software, firmware, and/or the like, that modify travel pathways based at least in part on energy estimation data. For example, the travel pathway processing circuitry 209 may modify a travel pathway to include indications of charging availability, battery swapping availability, payload management operations, revised sequences, added legs, removed legs, modified trajectories, charging durations, and/or the like. In some embodiments, the travel pathway processing circuitry 209 includes a separate processor, specially configured field programmable gate array (FPGA), and/or a specially programmed application specific integrated circuit (ASIC).

The estimation circuitry 211 includes hardware, software, firmware, and/or a combination thereof, that generate required battery levels for completing one or more legs of a travel pathway, estimated remaining battery levels upon completion of a leg of travel pathway, estimated charging durations, payload modifications, and/or the like. For example, in some contexts, the estimation circuitry 211 includes hardware, software, firmware, and/or the like, that generate a required battery level for a vehicle to traverse each particular leg of a travel pathway in accordance with a sequence of legs based at least in part on a current battery status of the vehicle, travel pathway data, vehicle station data, payload data, battery safety, margin, and/or the like. As another example, the estimation circuitry 211 includes hardware, software, firmware, and/or the like, that generate an estimated remaining battery level of a vehicle upon arrival at a vehicle station based at least in part on a current battery status of a vehicle, travel pathway data, vehicle station data, payload data, and/or the like. In another example, the estimation circuitry includes hardware, software, firmware, and/or the like that generate a charging duration (or increase to a charging duration) for a particular vehicle station corresponding to a leg of a travel pathway. In some embodiments, the estimation circuitry 211 includes hardware, software, firmware, and/or the like that generate a payload amount (e.g., amount of cargo, passengers, and/or the like) to be left at a particular vehicle station based at least in part on required battery levels, estimating remaining battery levels, battery safety margins, battery efficiency optimization, and/or the like. In some embodiments, the estimation circuitry 211 includes hardware, software, firmware, and/or the like that generate a payload amount to be loaded onto a vehicle at a particular vehicle station based at least in part on required battery levels, estimated remaining battery levels, battery safety margins, and/or the like. In some embodiments, the estimation circuitry 211 includes a separate processor, specially configured field programmable gate array (FPGA), and/or a specially programmed application specific integrated circuit (ASIC).

Additionally, or alternatively, in some embodiments, two or more of the processor 201, memory 203, communications circuitry 205, input/output circuitry 207, travel pathway processing circuitry 209, and/or estimation circuitry 211 are combinable. Additionally, or alternatively, in some embodiments, one or more of the sets of circuitry perform some or all of the functionality described associated with another component. For example, in some embodiments, two or more of the sets of circuitry 201-211 are combined into a single module embodied in hardware, software, firmware, and/or a combination thereof. Similarly, in some embodiments, one or more of the sets of circuitry, for example the memory 203, communication interface 205, travel pathway processing circuitry 209, and/or estimation circuitry 209 is/are combined with the processor 201, such that the processor 201 performs one or more of the operations described above with respect to each of these sets of circuitry 203-211.

Example Data Architectures, Workflows, and Graphical User Interfaces of the Disclosure Having described example systems and apparatuses in accordance with embodiments of the present disclosure, example data architectures, workflows and graphical user interfaces (GUIs) in accordance with the present disclosure will now be discussed. In some embodiments, the systems and/or apparatuses described herein maintain data environment(s) that enable the workflows and GUIs in accordance with the data architectures described herein. For example, in some embodiments, the systems and/or apparatuses described herein function in accordance with the data architecture 300, workflows 400, 500, and GUIs 600, 700, 800, 900 depicted in FIGS. 3, 4, 5, 6, 7, 8, and 9, respective, and described herein. In some embodiments, the data architectures, workflows, and GUIs described herein are maintained, performed, and/or generated via the apparatus 200.

FIG. 3. illustrates an example data architecture 300 in accordance with at least some example embodiments of the present disclosure. In some embodiments, the travel pathway data 110 includes a plurality of legs 301, one or more sequences 303, one or more safety margins 304, one or more layover intervals 305, and/or the like. In some embodiments, a set of legs 301 are associated with a particular sequence 303 that defines an order of traversal along the respective legs 301. For example, a travel pathway may include an origin leg, a terminal leg, and one or more intermediate legs between the origin and terminal legs, where traversal between the origin and terminal legs along the one or more intermediate legs is defined by a sequence 303. In some embodiments, a leg 301 is associated with one or more vehicle stations 106. For example, a leg 301 may include an origin point and a terminal point that are each associated with a different vehicle station 106. The vehicle station 106 that is associated with a terminal point of a first leg 301 may also embody an origin point of a second leg 301.

In some embodiments, a safety margin 304 defines one or more threshold values for operating the vehicle 101 during a mission (e.g., navigation of the vehicle along a travel pathway). In some embodiments, the safety margin 304 includes a threshold battery level. For example, the safety margin 304 may include a minimum battery level or battery reserve to be maintained throughout performance of a mission. In some embodiments, the safety margin 304 includes a threshold payload value. For example, the safety margin 304 may include a maximum payload mass, maximum passenger count, and/or the like, that may be carried by a vehicle 101. In some embodiments, the layover interval 305 defines an interval of time for which a vehicle 101 is to remain at a particular vehicle station 106 such that maintenance, payload management, crewmember rest or rotation, and/or the like may occur.

In some embodiments, the travel pathway data 110 is associated with one or more portions of vehicle data 112, one or more portions of vehicle station data 114, one or more portions of payload data 116, and/or the like. For example, a subset of travel pathway data 110 may define a particular travel pathway and be associated with a vehicle dataset, vehicle station dataset, payload dataset, and/or the like.

In some embodiments, the vehicle data 112 includes one or more current battery statuses 307, battery performance data 309, a carrying capacity 311, and/or the like. In some embodiments, the current battery status 307 includes a battery level. Additionally, or alternatively, the current battery status 307 includes a dissipation rate of the battery. In some embodiments, battery performance data 309 may include historical battery levels, battery dissipation rates, and/or the like. In some embodiments, battery performance data 309 includes historical charging durations, battery installation timestamps, battery maintenance timestamps, battery swapping timestamps, and/or the like. In some embodiments, battery performance data 309 includes one or more measurements of battery efficiency, battery health, and/or the like. In some embodiments, the battery performance data 309 includes battery weight. In some embodiments, the carrying capacity 311 indicates a maximum mass that may be carried by a vehicle 101, which may be optionally based upon a safety margin 304.

In some embodiments, the vehicle station data 114 includes one or more station locations 315, infrastructure data 317, one or more vehicle station statuses 319, and/or the like. In some embodiments, the station location 315 indicates a physical location of a vehicle station 106. For example, the station location 315 may indicate geographical coordinates and an elevation of a vehicle station 106. In some embodiments, the station location 315 indicates a distance between a first vehicle station 106 and one or more additional vehicle stations 106. In some embodiments, the infrastructure data 317 indicates infrastructure present at a vehicle station 106. For example, the infrastructure data 317 may indicate whether a vehicle station 106 includes battery charging infrastructure, battery swapping infrastructure, maintenance infrastructure, payload management infrastructure, and/or the like. In some embodiments, the vehicle station status 319 indicates a queue time at a vehicle station 106, such as an estimated wait time for landing at the vehicle station 106 or accessing battery swapping, battery charging, payload management, or maintenance services.

In some embodiments, the vehicle station status 319 indicates one or more environmental conditions at the vehicle station 106. For example, the vehicle station status 319 may indicate turbulence, wind, vehicle traffic density, precipitation, outside air temperature and/or the like at the vehicle station 106. In some embodiments, the vehicle station status 319 indicatives availability of charging infrastructure, battery swapping infrastructure, maintenance infrastructure, payload management infrastructure, and/or the like, at the vehicle station 106 (e.g., including whether said infrastructure is present or a wait time to utilize the infrastructure). For example, the vehicle station status 319 may include availability of battery swapping or maintenance personnel at the vehicle station 106.

In some embodiments, the payload data 116 includes cargo data 321, passenger data 323, one or more payload origins 325, one or more payload destinations 327, and/or the like. In some embodiments the cargo data 321 indicates one or more objects, materials, and/or the like to be transported via a vehicle 101. In some embodiments, the cargo data 321 includes a mass of the cargo. In some embodiments, the cargo data 321 indicates a payload origin 325 and a payload destination 327 for respective cargo. For example, the cargo data 321 may include a first payload origin and destination for a first set of cargo and a second payload origin and destination for a second set of cargo. In some embodiments, the cargo data 321 includes a delivery timestamp for transporting particular cargo to a particular vehicle station 106. In some embodiments, the cargo data 321 includes a pickup timestamp for obtaining particular cargo from a particular vehicle station 106.

In some embodiments, the passenger data 323 indicates one or more passengers to be transported via a vehicle 101. In some embodiments, the passenger data 323 includes one or more passenger quantities, one or more passenger masses, an average passenger mass, one or more passenger classifications (e.g., child, teen adult, light, average, heavy, and/or the like), one or more passenger identifiers, and/or the like. In some embodiments, the passenger data 323 indicates a respective payload origin 325 and a payload destination 327 for one or more passengers. For example, the passenger data 323 may indicate a first vehicle station 106 at which a passenger may board a vehicle 101 and a second vehicle station at which a passenger may deboard the vehicle 101. In some embodiments, the passenger data 323 includes pickup and drop-off timestamps, intervals, and/or the like that define when a passenger is expected to depart from and arrive at respective vehicle stations 106.

In some embodiments, the energy estimation data 118 includes required battery levels 329, estimated remaining battery levels, and adjustment operation indicates 333. In some embodiments, a required battery level 329 indicates a portion of battery capacity required for a vehicle 101 to traverse a leg of a travel pathway. In some embodiments, the required battery level 329 is based at least in part on a safety margin, such as a battery safety margin. In some embodiments, an estimated remaining battery level 329 indicates a remaining capacity of a battery upon arrival at a vehicle station 106 corresponding to completion of a particular leg 301. In some embodiments, a battery level is expressed as a percentage of battery capacity, a vehicle movement distance, a vehicle movement duration, and/or the like.

In some embodiments, an adjustment operation indication 333 defines one or more actions that may be performed to ensure completion of a travel pathway, improve operational efficiency of the vehicle 101, maintain battery health, and/or the like. In some embodiments, an adjustment operation indication 333 includes a location at which an adjustment operation may be performed. For example, an adjustment operation indication 333 may include a station location 315 for a particular vehicle station 106. In some embodiments, an adjustment operation includes swapping a battery of the vehicle 101. In some embodiments, an adjustment operation includes charging a battery of the vehicle 101. In some embodiments, an adjustment operation includes an increase to or reduction of a planned charging duration of a vehicle at a particular vehicle station 106. In some embodiments, an adjustment operation indication 333 includes a charging duration. In some embodiments, an adjustment operation includes reducing or adding to a payload of the vehicle 101. In some embodiments, an adjustment operation includes a reordered sequence 303 defining a revised course of travel along a plurality of legs 301. In some embodiments, an adjustment operation includes rendering a battery warning, charging advisory, and/or the like on a display of a control station 105. In some embodiments, an adjustment operation includes monitoring efficiency of a battery in real-time to determine whether to swap, charge, and/or service the battery. In some embodiments, an adjustment operation includes servicing a battery, such as replacing, repairing, calibrating, testing, or cleaning one or more battery components.

In some embodiments, energy estimation data 118 is generated based at least in part on travel pathway data 110, vehicle data 112, vehicle station data 114, payload data 116, and/or the like. For example, a required battery level 329 for a vehicle 101 to traverse a particular leg 301 in a sequence 303 may be generated based at least in part on a current battery status 307, travel pathway data 110, one or more portions of a vehicle station dataset, one or more portions of a payload dataset. As another example, an estimated remaining battery level 331 of a vehicle 101 upon arrival at a vehicle station 106 corresponding to the particular leg 301 may be generated based at least in part on a current battery status 307, travel pathway data 110, one or more portions of a vehicle station dataset, one or more portions of a payload dataset. In still another example, one or more adjustment operation indications 333 may be generated based at least in part on respective required battery levels 329 and estimated remaining battery levels 331 corresponding to each leg 301 in the sequence 303 and further based at least in part on one or more vehicle station datasets, payload datasets, vehicle datasets, and/or the like.

FIG. 4 illustrates an example workflow 400 for travel pathway planning. In various embodiments, the workflow 400 is performed by one or more apparatuses 200 that embody an energy estimation system 103 as described herein. In various embodiments, the apparatus 200 performs the workflow 400 to generate one or more adjustment operation indications 333. The apparatus 200 may cause rendering of a GUI comprising the one or more adjustment operation indications 333 on one or more displays, such as a display of a control station, vehicle station, vehicle, and/or the like. As shown, the apparatus 200 may generate the adjustment operation indication 333 based at least in part on travel pathway data 110, payload data 116, vehicle station data 114, vehicle data 112, and/or the like. For example, the apparatus 200 may generate the adjustment operation indication 333 based at least in part on a sequence of legs, one or more payloads to be transported between respective legs along the sequence, a vehicle station dataset indicative of charging infrastructure availability, and a vehicle dataset including a current battery status and a total battery capacity.

In some embodiments, in a first operation of the workflow 400, the apparatus 200 performs sequential planning management. For example, the apparatus 200 may process the travel pathway data 110, payload dataset, and vehicle station dataset to determine a sequence by which to traverse between an origin leg, one or more intermediary legs, and a terminal leg. In some embodiments, a respective leg is associated with a particular vehicle station 106.

In some embodiments, in a second operation of the workflow 400, the apparatus 200 the apparatus 200 performs battery advisory processes to determine required battery levels and estimated remaining battery levels needed respective to completion of each leg according to the sequence and payload. In some embodiments, in a third operation of the workflow 400, the apparatus 200 generates one or more adjustment operation indications 333 based at least in part on the sequence of legs, required battery levels, estimated remaining battery levels, vehicle station dataset, and current battery data of the vehicle. In some embodiments, the adjustment operation includes rendering a battery warning on a display of a control station 105 associated with the vehicle. In some embodiments, the adjustment operation includes rendering a charging advisory, swapping advisory, payload reduction advisory, and/or the like based at least in part on the display. In some embodiments, the adjustment operation includes monitoring battery efficiency of the vehicle in real-time to further determine whether to charge, swap, or service the battery and/or whether to reduce a payload of the vehicle or reorder the sequence of legs to improve battery efficiency and/or preserve battery health. In some embodiments, the adjustment operation includes performing maintenance on the battery of the vehicle. For example, the maintenance may include replacing one or more battery components, calibrating one or battery discharge processes, updating battery software or firmware, inspecting the battery for flaws, cleaning the battery, swapping the battery, and/or the like.

In some embodiments, in a fourth operation of the workflow 400, the apparatus causes rendering of a GUI on a display of a control station 105 associated with the vehicle. In some embodiments, the GUI includes one or more adjustment operation indications 333. In some embodiments, the GUI includes a mapping of the legs and corresponding vehicle stations 106. In some embodiments, the GUI includes an interface element corresponding to each vehicle station 106. In some embodiments, a respective interface element indicates availability of charging infrastructure, battery swapping infrastructure, maintenance infrastructure, payload management infrastructure, and/or the like at the vehicle station 106. In some embodiments, a respective interface element indicates a payload to be loaded or unloaded to or from the vehicle at the vehicle station 106. In some embodiments, a respective interface element indicates a revised sequence of the legs of the travel pathway, one or more adjusted leg trajectories or altitudes, and/or the like.

FIG. 5 illustrates an example workflow 500 for travel pathway planning. In various embodiments, the workflow 500 is performed by one or more apparatuses 200 that embody an energy estimation system 103 as described herein. In various embodiments, the apparatus 200 performs the workflow 500 to generate one or more indications of whether to perform a respective adjustment operation and determine parameters of the adjustment operation.

In some embodiments, at block 503 the workflow 500 includes the apparatus 200 performing payload planning for a plurality of vehicle stations, where a respective vehicle station corresponds to one of a sequence of legs of a travel pathway. In some embodiments, for a respective vehicle station, the apparatus 200 determines one or more payloads, or subsets thereof, to be loaded into or unloaded from a vehicle upon arrival of the vehicle at the vehicle station. For example, the apparatus 200 determines particular cargo, cargo amounts, passengers, and/or the like to be loaded into or unloaded from the vehicle. In some embodiments, the apparatus 200 performs payload planning based at least in part on travel pathway data 110, vehicle station data 114, payload data 116, and/or the like. In some embodiments, the apparatus 200 performs payload planning based at least in part on a carrying capacity of the vehicle.

In some embodiments, at block 506 the workflow 500 includes the apparatus 200 generating respective battery estimations for the vehicle stations corresponding to the legs of the travel pathway. In some embodiments, the apparatus generates a required battery level and an estimated remaining battery level of the vehicle corresponding to completion of each leg (e.g., comprising departure from a first vehicle station and arrival at a second vehicle station). In some embodiments, at block 509 the workflow 500 includes the apparatus 200 comparing the respective required battery levels and estimated remaining battery levels for the vehicle stations. For example, the apparatus 200 may determine whether an estimated remaining battery level of a vehicle upon arrival at a first vehicle station is less than a required battery level for traversing the vehicle from the first vehicle station to one or more additional vehicle stations. In some embodiments, at block 512, the workflow 500 includes the apparatus 200 determining that one or more estimated remaining battery levels are less than subsequent required battery levels for completing subsequent legs of the travel pathway. In some embodiments, at block 515 the workflow 500 includes the apparatus 200 determining whether charging infrastructure is available at the particular vehicle station that is subsequent to the leg for which the estimated remaining battery level is less than the required battery level.

In some embodiments, at block 518 the workflow 500 includes the apparatus 200 generating an indication to charge or swap the battery of the vehicle at a previous vehicle station in response to determining that charging infrastructure is unavailable at the particular vehicle station for which the estimated remaining battery level is than the required battery level for completing a subsequent leg of the travel pathway. In some embodiments, at block 521 the workflow 500 includes the apparatus 200 adding charging time at one or more vehicle stations in response to determining that charging infrastructure is available. For example, in response to the apparatus 200 may add charging time to an estimated time of departure (ETD) of a vehicle from a particular vehicle station, where the vehicle station corresponds to an origin point of a leg for which the estimated remaining battery level is less than the required battery level. In some embodiments, the workflow 500 includes the apparatus 200 providing the estimated remaining battery levels, required battery levels, charging time increases, charging indications, swapping indications, and/or the like to a control station associated with the vehicle to cause the control station to control the vehicle based at least in part on the one or more workflow outputs.

FIG. 6 illustrates an example control station display 111 having rendered thereon a GUI 600 for performing travel pathway planning. In some embodiments, the GUI 600 includes a travel pathway selection interface 601. In some embodiments, the travel pathway selection interface 601 includes a plurality of selectable fields that correspond to respective legs 301A, 301B, 301C, 301D of a travel pathway. In some embodiments, the travel pathway selection interface 601 is configured to receive a user input to a selectable field to enable entry of data associated with the corresponding leg at the mission planner interface 603 (e.g., leg 301D being shown as selected in FIG. 6). In some embodiments, the travel pathway selection interface 601 indicates an active leg that is currently being traversed by the corresponding vehicle. In some embodiments, the travel pathway selection interface 601 includes a selectable field for inputting data respective to one or more secondary legs, which may embody alternative trajectories, missions, and/or the like for the travel pathway.

In some embodiments, the GUI 600 includes a mission planner interface 603. In some embodiments, the mission planner interface 603 includes fields 605, 607, 609, 611, 613 that may be populated via user inputs or automatically based on travel pathway data, vehicle data, vehicle station data, payload data, and/or the like such that the inputted values may be used to perform mission energy calculations. In some embodiments, a respective field includes subfields 606 corresponding to each leg of the travel pathway such that data associated with the particular leg may be recorded. In some embodiments, the field 605 is configured to receive an elevation of the vehicle 101 while traversing the leg and/or navigating to or from a vehicle station associated with a terminal end of the leg.

In some embodiments, the field 607 is configured to receive outside air temperature (OAT) at one or more portions of the leg including at a vehicle station embodying an origin of the leg and a second vehicle station embodying a terminal point of the leg. In some embodiments, the field 607 receives an average OAT along the leg. In some embodiments, the field 609 is configured to receive passenger data including a passenger count, respective passenger masses, total passenger mass and/or the like. In some embodiments, the field 611 is configured to receive cargo data including cargo quantities, masses, and/or the like. In some embodiments, the field 613 is configured to receive wind, precipitation, turbulence, outside air temperature, or other environmental conditions along the leg of the travel pathway and/or at a vehicle station associated with the travel pathway.

In some embodiments, the GUI 600 includes a mission energy calculation interface 615. In some embodiments, the mission energy calculation interface 615 includes, for each leg, a required battery level 617, estimated remaining battery level 619, charging indication 621, and swapping indication 623. In some embodiments, the charging indication 621 indicates whether to charge the battery at a vehicle station 106 corresponding to the leg. In some embodiments, the charging indication 621 indicates a target battery level, time interval, and/or the like for the battery charging. Alternatively, in some embodiments, the charging indication 621 indicates whether charging infrastructure is available at the vehicle station 106. In some embodiments, the swapping indication 623 indicates whether to swap the battery of the vehicle at the vehicle station 106 corresponding to the leg. Alternatively, in some embodiments, the swapping indication 623 indicates whether battery swapping infrastructure is available at the vehicle station 106.

In an example scenario, the mission energy calculation interface 615 may indicate that required battery levels for completing legs 301A, 301B, 301C, 301D are 50%, 20%, 60%, and 40%, respectively. The mission energy calculation interface 615 may indicate that estimated remaining battery levels at vehicle station corresponding to the origin points of each leg 301A, 301B, 301C, 301D are 100%, 50%, 30%, and 10%, respectively. The mission energy calculation interface 615 may include indications that performance battery charging or swapping operations is not required at the vehicle stations corresponding to legs 301A, 301B based at least in part on the estimated remaining battery levels being greater than the required battery levels. The mission energy calculation interface 615 may indicate that charging is required at a vehicle station corresponding to the origin point of the leg 301C in response to the estimated remaining battery level being less than the required battery level. The indication may include a charging level or duration, such as an indication to increase the battery level by 30% or 40% (e.g., based at least in part on a battery safety margin). The mission energy calculation interface 615 may include an indication to swap the battery of the vehicle at the vehicle station corresponding to the origin point of the leg 301D. The swapping indication may be based at least in part on a determining that charging infrastructure is unavailable at the particular vehicle station or that a required charging time exceeds a predetermined threshold for completing the travel pathway.

FIG. 7 illustrates an example control station display 111 having rendered thereon a GUI 700 comprising a mapping of a travel pathway 701. The apparatus 200 may cause rendering of the GUI 700 at the control station display 111. In some embodiments, the rendered travel pathway 701 includes a plurality of legs 301A, 301B, 301C, 301D. In some embodiments, the GUI 700 includes interface elements 703A, 703B, 703C, 703D, 703E that indicate locations of vehicle stations corresponding to the legs 301A, 301B, 301C, 301D. In some embodiments, the interface elements 703A, 703B, 703C, 703D, 703E are rendered in a particular color, pattern, and/or the like to indicate one or more conditions or statuses of the corresponding vehicle station. For example, the interface elements 703A, 703E may be rendered in a particular color, pattern, and/or the like that indicates status of the corresponding vehicle station as a source or destination of the travel pathway. In another example, the interface element 703B may be rendered in a different color, pattern, and/or the like that indicates the corresponding vehicle station is a payload drop-off or pickup point without battery charging and/or swapping infrastructure. In another example, the interface elements 703C, 703D may be rendered in a particular color, pattern, and/or the like that indicates battery charging and/or swapping infrastructure is available at the corresponding vehicle stations.

FIG. 8 illustrates an example control station display 111 having rendered thereon a GUI 800 comprising a travel pathway 801. The apparatus 200 may cause rendering of the GUI 800 at the control station display 111. In some embodiments, the GUI 800 includes elements and symbology schema similar to the GUI 700 shown in FIG. 7 and described herein. In various embodiments, rendered on the travel pathway 801 are one or more payload management elements 803. In some embodiments, a payload management element 803 indicates a payload of the vehicle upon arrival at or departure from a particular vehicle station and a respective destination of one or more subset of the payload. For example, a payload management element for a first vehicle station ("Station A") may indicate pickup of six passengers, where two passengers are to be dropped off at a subsequent vehicle station ("Station B") and four passengers are to be dropped of at another vehicle station ("Station C"). In another example, a payload management element for Station B may indicate drop-off of the two Station A passengers and pickup of an additional two passengers to be dropped off at Station C. In still another example, a payload management element for Station C may indicate drop-off of said passengers and pickup of six new passengers, where three passengers are to be dropped off at "Station D" and three passengers are to be dropped off at "Station E." A payload management element for Station D may indicate drop-off of the former set of three passengers and pickup of an additional three passengers to be dropped off at station E.

FIG. 9 illustrates an example control station display 111 having rendered thereon a GUI 900 comprising a travel pathway 901. The apparatus 200 may cause rendering of the GUI 900 at the control station display 111. The GUI 900 may include payload management elements similar to the GUI 800 shown in FIG. 8 and described herein. The payload management elements of the GUI 900 may correspond to pickup and drop-off of cargo along the travel pathway 901. It will be understood and appreciated that a mission and travel pathway may include a vehicle transporting a mixture of cargo and passengers, where subsets of cargo and passengers may be boarded and deboarded to and from the vehicle at vehicle stations corresponding to the legs 301A, B, C, D of the travel pathway.

Example Processes of the Disclosure

Having described example systems and apparatuses, data architectures, and data flows in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally, or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 10 illustrates a flowchart depicting operations of an example process 1000 for energy-based travel pathway planning in accordance with at least some example embodiments of the present disclosure. In some embodiments, the process 1000 is embodied by computer program code stored on a non-transitory computer-readable storage medium of a computer program product configured for execution to perform the process as depicted and described. Additionally, or alternatively, in some embodiments, the process 1000 is performed by one or more specially configured computing devices, such as apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 203 and/or another component depicted and/or described herein and/or otherwise accessible to the apparatus 200, for performing the operations as depicted and described.

In some embodiments, the apparatus 200 is in communication with one or more internal or external apparatus(es), system(s), device(s), and/or the like, to perform one or more of the operations as depicted and described. For example, the apparatus 200 may communicate with one or more vehicles 101, control stations 105, vehicle stations 106, and/or the like to perform one or more operations of the process 1000. In some embodiments, the apparatus 200 performs the process 1000 in response to receiving travel pathway data defining a travel pathway for a vehicle, the travel pathway comprising a plurality of legs and a sequence of travel along the plurality of legs.

At operation 1003, the apparatus 200 optionally includes means such as the travel pathway processing circuitry 209, the estimation circuitry 211, the communications circuitry 205, the input/output circuitry 207, the processor 201, and/or the like, or a combination thereof, that obtain a travel pathway. For example, the apparatus 200 may obtain travel pathway data 112 from a data store 104, control station 105, vehicle 101, and/or the like, where the travel pathway data 112 includes a travel pathway. In some embodiments, the travel pathway defines a sequence of legs to travel for a particular vehicle 101, where each leg is associated with a vehicle station. In some embodiments, the sequence of legs comprises an origin leg, a terminal leg, and one or more intermediary legs sequenced between the origin leg and the terminal leg. In some embodiments, the travel pathway data 112 includes a battery safety margin, payload safety margin, and/or the like for the travel pathway. In some embodiments, the travel pathway includes a respective layover interval for personnel responsible for controlling the vehicle or servicing the vehicle at the respective vehicle stations corresponding to the legs of the travel pathway.

At operation 1006, the apparatus 200 includes means such as the travel pathway processing circuitry 209, the estimation circuitry 211, the communications circuitry 205, the input/output circuitry 207, the processor 201, and/or the like, or a combination thereof, that obtain vehicle station data 114. For example, the apparatus 200 may obtain one or more vehicle station datasets corresponding to the vehicle stations 106 associated with each leg of the travel pathway. In some embodiments, the vehicle station data 114 includes respective locations, elevations, and/or the like of the vehicle stations 106. In some embodiments, the vehicle station data 114 includes one or more vehicle station statuses for a respective vehicle station 106. In some embodiments, the vehicle station status originates from the vehicle station or an additional vehicle 101 that has traveled to the vehicle station 106. For example, the vehicle station status may be reported by the additional vehicle to the apparatus 200 or a control station 105 that relays the vehicle station status to the apparatus 200. In some embodiments, the vehicle station status indicates a queue time at the vehicle station 106. In some embodiments, the vehicle station status indicates turbulence at the vehicle station 106. In some embodiments, the vehicle station status indicates availability of charging infrastructure at the vehicle station 106. In some embodiments, the vehicle station status indicates availability of battery swapping at the vehicle station 106. In some embodiments, the vehicle station status indicates availability of maintenance personnel at the vehicle station 106. In some embodiments, the vehicle station status indicates vehicle traffic density at the vehicle station. In some embodiments, the vehicle station status indicates a wind condition, precipitation condition, temperature condition, or other environmental condition at the vehicle station 106 and/or along a corresponding leg of the travel pathway.

At operation 1009, the apparatus 200 includes means such as the travel pathway processing circuitry 209, the estimation circuitry 211, the communications circuitry 205, the input/output circuitry 207, the processor 201, and/or the like, or a combination thereof, that obtain a current battery status of the vehicle. For example, the apparatus 200 may obtain vehicle data comprising one or more current battery statuses of the vehicle 101. In some embodiments, the current battery status includes a battery dissipation rate, battery level, battery capacity, battery temperature, battery efficiency metric, and/or the like. In some embodiments, the apparatus 200 receives the current battery status from the vehicle 101. Alternatively, in some embodiments, the apparatus 200 receives the current battery status from a control station 105 associated with the vehicle 101.

At operation 1012, the apparatus 200 includes means such as the travel pathway processing circuitry 209, the estimation circuitry 211, the communications circuitry 205, the input/output circuitry 207, the processor 201, and/or the like, or a combination thereof, that obtain one or more payload datasets. For example, the apparatus 200 may obtain payload data 116 including one or more payload datasets associated with legs of the travel pathway. In some embodiments, the apparatus 200 obtains the payload data 116 from a data store 104. Alternatively, or additionally, the apparatus 200 may obtain the payload data from a control station 105, vehicle station 106, and/or the like. In some embodiments a payload dataset indicates a quantity of passengers, respective passenger weights, passenger classifications, estimated weights for passenger classifications, cargo weights, and/or the like. In some embodiments, the payload dataset indicates respective origins and destinations for one or more subsets of the payload. For example, the payload dataset may include associations between subsets of the payload and particular travel pathway legs, vehicle stations 106, and/or the like.

In some embodiments, one or more of operations 1003-1012 are performed by the apparatus 200 based at least in part on user inputs received via one or more GUIs. For example, the apparatus 200 may obtain payload data, vehicle station data, vehicle data, travel pathway data, and/or the like via inputs to a GUI 600 as shown in FIG. 6 and described herein. In some embodiments, the apparatus 200 renders one or more interface elements for receiving one or more of said data in response to receiving selection of a particular travel pathway or leg thereof via a GUI.

At operation 1015, the apparatus 200 includes means such as the travel pathway processing circuitry 209, the estimation circuitry 211, the communications circuitry 205, the input/output circuitry 207, the processor 201, and/or the like, or a combination thereof, that generate required battery levels for completing the legs of the travel pathway. For example, the apparatus 200 may generate a respective required battery level for completing each leg of the travel pathway in accordance with the sequence. In some embodiments, the apparatus 200 generates a required battery level for completing a respective leg based at least in part on the current battery status of the vehicle, the travel pathway data of operation 1003, one or more portions of the vehicle station dataset of operation 1006, one or more portions of the payload dataset of operation 1009, and/or the like. In some embodiments, the apparatus 200 renders the required battery levels on a display 111 of a control station, a display of the vehicle 101, and/or the like. In some embodiments, the apparatus 200 generates a required battery level based at least in part on a battery safety margin, such as 10% of reserve battery capacity or another suitable value.

At operation 1018, the apparatus 200 includes means such as the travel pathway processing circuitry 209, the estimation circuitry 211, the communications circuitry 205, the input/output circuitry 207, the processor 201, and/or the like, or a combination thereof, that generate estimated remaining battery levels for the legs of the travel pathway. For example, the apparatus 200 may generate, for each leg in accordance with the sequence of legs, an estimated remaining battery level of the vehicle upon arrival at the vehicle station corresponding to the particular leg. In some embodiments, the apparatus 200 generates a respective estimated remaining battery level based at least in part on the current battery status of the vehicle, the travel pathway data of operation 1003, one or more portions of the vehicle station dataset of operation 1006, one or more portions of the payload dataset of operation 1009, and/or the like. In some embodiments, the apparatus 200 renders the estimated remaining battery levels on a display 111 of a control station, a display of the vehicle 101, and/or the like.

At operation 1021, the apparatus 200 includes means such as the travel pathway processing circuitry 209, the estimation circuitry 211, the communications circuitry 205, the input/output circuitry 207, the processor 201, and/or the like, or a combination thereof, that generate one or more indications of whether to perform one or more adjustment operations at one or more vehicle stations along the travel pathway. For example, the apparatus 200 may generate an indication for each particular vehicle station representing whether to perform at that particular vehicle station one or more adjustment operations. In some embodiments, the apparatus 200 generates the one or more adjustment operation indications based at least in part on the required battery levels of operation 1015, the estimated remaining battery levels of operation 1018, and the vehicle station dataset of operation 1006. In some embodiments, the apparatus 200 generates the one or more adjustment operation indications further based at least in part on the travel pathway data of operation 1003, the vehicle data of operation 1009, the payload dataset of operation 1012, and/or the like.

In some embodiments, the adjustment operation includes a swapping of the battery of the vehicle. In some embodiments, the apparatus 200 provisions a notification to the vehicle station 106 at which battery swapping will be performed. In some embodiments, the adjustment operation includes the apparatus 200 modifying a trajectory of one or more legs to improve battery efficiency, reduce battery expenditure, and/or the like. In some embodiments, the adjustment operation includes the apparatus 200 generating a reordered sequence for traversing the legs of the travel pathway to improve battery efficiency, maintain battery health, optimize vehicle station resource and infrastructure usage, and/or the like.

In some embodiments, the adjustment operation includes a payload reduction. For example, the adjustment operation may include causing the vehicle 101 to drop off a portion of a payload at an intermediate point (e.g., vehicle station 106) between an origin and destination of the payload. As another example, the adjustment operation may include causing the vehicle 101 to pick up a subset of a total payload from its origin point. In some embodiments, the adjustment operation includes, based at least in part on the payload reduction, updating travel pathway data for a second vehicle 101, where the updated travel pathway data for the second vehicle 101 defines one or more legs for completing delivery of the portion of the payload left at the particular vehicle station 106. In some embodiments, the apparatus 200 provisions a notification to the vehicle station 106 at which the subset of the payload is to be left.

In some embodiments, the adjustment operation includes an increase to a charging duration of the battery of the vehicle 101 at the particular vehicle station 106 to ensure the vehicle 101 is able to complete the corresponding leg (or multiple legs) within a battery safety margin. For example, the adjustment operation may include causing the vehicle 101 to charge for an additional time interval at a particular vehicle station 106. In some embodiments, the adjustment operation includes a reduction to a charging duration of the battery at one or more vehicle stations to increase operational efficiency of traversing the travel pathway, maintain battery efficiency, and/or the like. In some embodiments, the apparatus generates an updated charging duration and provisions the updated charging duration to the vehicle 101, a control station 105 associated with the vehicle 101, a vehicle station 106 at which the charging will be performed, and/or the like.

At operation 1024, the apparatus 200 includes means such as the travel pathway processing circuitry 209, the estimation circuitry 211, the communications circuitry 205, the input/output circuitry 207, the processor 201, and/or the like, or a combination thereof, that render a GUI comprising the one or more indications for adjustment operations on one or more displays. For example, the apparatus 200 may render one or more GUIs on a display 111 of a control station 105 associated with the vehicle 101. In some embodiments, the GUI is similar to one or more of GUIs 600, 700, 800, 900 shown in FIGS. 6, 7, 8, and 9, respectively, and described herein. In some embodiments the GUI includes, for each leg of the travel pathway, an indication of whether to perform one or more adjustment operations at the particular vehicle station 106 corresponding to the leg. For example, the GUI may include an indication to charge or swap a battery at a particular vehicle station 106. As another example, the GUI may include a reordered sequence for traversing the legs of the travel pathway. In another example, the GUI may include one or more payload management interfaces that indicate drop-off and pickup parameters for one or more subsets of payloads associated with the travel pathway. In some embodiments, the GUI includes a mapping of the travel pathway legs according to the sequence and respective vehicle stations 106 associated with the legs. In some embodiments, the GUI includes respective interface elements for each vehicle station 106. The interface element may indicate the availability of battery swapping, battery charging, payload management, maintenance personnel, and/or the like at the vehicle station 106.

In some embodiments, the GUI includes one or more battery warnings that indicate an estimated remaining battery level may fall below a required battery level. In some embodiments, the GUI includes one or more battery charging or swapping advisories that instruct an operator of the control station 105 to land the vehicle 101 at a particular vehicle station to enable performance of the corresponding operation. In some embodiments, the GUI includes output from a battery efficiency monitor to enable an operator of the control station 105 to evaluate battery health and performance, including monitoring battery dissipation rates, charging rates, battery capacities, battery temperatures, and/or the like. In some embodiments, the GUI includes one or more indications to perform battery maintenance including cleaning battery components, replacing battery components, updating battery software or firmware, recalibrating one or more battery components, and/or the like.

At operation 1027, the apparatus 200 optionally includes means such as the travel pathway processing circuitry 209, the estimation circuitry 211, the communications circuitry 205, the input/output circuitry 207, the processor 201, and/or the like, or a combination thereof, that control the vehicle based at least in part on the one or more adjustment operations of operation 1021. For example, the apparatus 200 may cause a control station 105 to navigate the vehicle 101 along a reordered sequence of travel pathway legs to improve battery efficiency. As another example, the apparatus 200 may cause the vehicle 101 to land at a particular vehicle station 106 and load or unload a payload or subset thereof. In another example, the apparatus 200 may cause a vehicle station 106 to charge a battery of the vehicle 101 for a particular interval. In still another example, the apparatus 200 may cause a vehicle station to swap the battery of the vehicle 101.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    obtaining travel pathway data for a vehicle, the travel pathway data defining a sequence of legs to travel, wherein each leg is associated with a vehicle station;
    retrieving a vehicle station dataset comprising vehicle station data for each vehicle station corresponding to at least one leg of the sequence of legs, wherein the vehicle station data for a respective vehicle station comprises at least one vehicle station status reported by an additional vehicle;
    receiving a current battery status of the vehicle, the current battery status indicative of a battery dissipation rate;
    receiving a payload dataset comprising respective payload data for each vehicle station;
    generating, for each particular leg in accordance with the sequence of legs and based at least in part on (i) the current battery status of the vehicle, (ii) the travel pathway data, (iii) at least a portion of the vehicle station dataset, and (iv) at least a portion of the payload dataset, a required battery level for the vehicle to traverse the particular leg in the sequence of legs;
    generating, for each particular leg in accordance with the sequence of legs and based at least in part on (i) the current battery status of the vehicle, (ii) the travel pathway data, and (iii) at least the portion of the vehicle station dataset, and (iv) at least the portion of the payload dataset an estimated remaining battery level of the vehicle upon arrival at the vehicle station corresponding to the particular leg;
    generating, based at least in part on (i) the estimated remaining battery levels, (ii) the required battery levels, and (iii) the vehicle station dataset, an indication for each particular vehicle station representing whether to perform at that particular vehicle station at least one adjustment operation; and
    rendering a graphical user interface (GUI) comprising, for each leg of the sequence of legs, the indication of whether to perform the at least one adjustment operation at the particular vehicle station corresponding to the leg, wherein the at least one adjustment operation comprises a payload reduction.

2. The method of claim 1, wherein:
    the at least one adjustment operation comprises a swapping of the battery of the vehicle.

3. The method of claim 2, wherein the GUI further comprises:
    a mapping of the sequence of legs and corresponding vehicle stations; and
    an interface element corresponding to each particular vehicle station, wherein the interface element for each particular vehicle station indicates availability of battery swapping at the particular vehicle station.

4. The method of claim 2, wherein:
    the sequence of legs comprises an origin leg, a terminal leg, and an intermediary leg sequenced between the origin leg and the terminal leg; and
    in response to generating a particular indication to perform the swapping of the battery at the vehicle station corresponding to the intermediary leg, the method further comprises reordering the sequence of travel along the sequence of legs to improve battery efficiency.

5. The method of claim 1, wherein:
    the payload reduction indicates a portion of the payload of the vehicle to leave at the particular vehicle station; and
    the method further comprises:
        based at least in part on the payload reduction, updating travel pathway data for a second vehicle, wherein the updated travel pathway data for the second vehicle defines at least one leg for completing delivery of the portion of the payload left at the particular vehicle station.

6. The method of claim 1, wherein:
    the at least one vehicle station status indicates a queue time at the vehicle station.

7. The method of claim 1, wherein:
the at least one vehicle station status indicates availability of charging infrastructure at the vehicle station.

8. The method of claim 1, wherein:
the payload data comprises at least one of a quantity of passengers or an amount of cargo to be transported by the vehicle to or from the corresponding vehicle station in the sequence of legs.

9. An apparatus comprising at least one processor and at least one non-transitory memory having computer-coded instructions stored thereon that, in execution with at least one processor, cause the apparatus to:
obtain travel pathway data for a vehicle, the travel pathway data defining a sequence of legs to travel, wherein each leg is associated with a vehicle station;
retrieve a vehicle station dataset comprising vehicle station data for each vehicle station corresponding to at least one leg of the sequence of legs, wherein:
the vehicle station data for a respective vehicle station comprises at least one vehicle station status reported by an additional vehicle; and
the at least one vehicle station status indicates at least one of turbulence at the vehicle station, a wind condition at the vehicle station, or a precipitation condition at the vehicle station;
receive a current battery status of the vehicle, the current battery status indicative of a battery dissipation rate;
receive a payload dataset comprising respective payload data for each vehicle station; generate, for each particular leg in accordance with the sequence of legs and based at least in part on (i) the current battery status of the vehicle, (ii) the travel pathway data, (iii) at least a portion of the vehicle station dataset, and (iv) at least a portion of the payload dataset, a required battery level for the vehicle to traverse the particular leg in the sequence of legs;
generate, for each particular leg in accordance with the sequence of legs and based at least in part on (i) the current battery status of the vehicle, (ii) the travel pathway data, and (iii) at least the portion of the vehicle station dataset, and (iv) at least the portion of the payload dataset an estimated remaining battery level of the vehicle upon arrival at the vehicle station corresponding to the particular leg;
generate, based at least in part on (i) the estimated remaining battery levels, (ii) the required battery levels, and (iii) the vehicle station dataset, an indication for each particular vehicle station representing whether to perform at that particular vehicle station at least one adjustment operation; and
render a graphical user interface (GUI) comprising, for each leg of the sequence of legs, the indication of whether to perform the at least one adjustment operation at the particular vehicle station corresponding to the leg.

10. The apparatus of claim 9, wherein:
the at least one adjustment operation comprises an increase to a charging duration of the battery of the vehicle at the particular vehicle station.

11. The apparatus of claim 10, wherein:
the indication of whether to perform the at least one adjustment operation at the particular vehicle station comprises an updated charging duration.

12. The apparatus of claim 9, wherein:
the at least one vehicle station status indicates availability of battery swapping at the vehicle station.

13. The apparatus of claim 9, wherein:
the at least one vehicle station status indicates availability of maintenance personnel at the vehicle station.

14. The apparatus of claim 9, wherein:
the travel pathway data comprises a battery safety margin for the travel pathway.

15. The apparatus of claim 9, wherein:
the travel pathway data comprises a respective layover interval for personnel at the vehicle station at each leg.

16. The apparatus of claim 9, wherein:
the at least one vehicle station status indicates vehicle traffic density at the vehicle station.

17. A computer program product comprising at least one non-transitory computer-readable storage medium having computer program code stored thereon that, in execution with at least one processor, is configured to:
obtain travel pathway data for a vehicle, the travel pathway data defining a sequence of legs to travel, wherein each leg is associated with a vehicle station;
retrieve a vehicle station dataset comprising vehicle station data for each vehicle station corresponding to at least one leg of the sequence of legs, wherein the vehicle station data for a respective vehicle station comprises at least one vehicle station status reported by an additional vehicle;
receive a current battery status of the vehicle, the current battery status indicative of a battery dissipation rate;
receive a payload dataset comprising respective payload data for each vehicle station;
generate, for each particular leg in accordance with the sequence of legs and based at least in part on (i) the current battery status of the vehicle, (ii) the travel pathway data, (iii) at least a portion of the vehicle station dataset, and (iv) at least a portion of the payload dataset, a required battery level for the vehicle to traverse the particular leg in the sequence of legs;
generate, for each particular leg in accordance with the sequence of legs and based at least in part on (i) the current battery status of the vehicle, (ii) the travel pathway data, and (iii) at least the portion of the vehicle station dataset, and (iv) at least the portion of the payload dataset an estimated remaining battery level of the vehicle upon arrival at the vehicle station corresponding to the particular leg;
generate, based at least in part on (i) the estimated remaining battery levels, (ii) the required battery levels, and (iii) the vehicle station dataset, an indication for each particular vehicle station representing whether to perform at that particular vehicle station at least one adjustment operation;
render a graphical user interface (GUI) comprising, for each leg of the sequence of legs, the indication of whether to perform the at least one adjustment operation at the particular vehicle station corresponding to the leg, wherein:
the at least one adjustment operation comprises a swapping of the battery of the vehicle; and
the sequence of legs comprises an origin leg, a terminal leg, and an intermediary leg sequenced between the origin leg and the terminal leg; and
in response to generating a particular indication to perform the swapping of the battery at the vehicle station corresponding to the intermediary leg, reorder the sequence of travel along the sequence of legs based on battery efficiency.

* * * * *